(12) United States Patent
Yokoi et al.

(10) Patent No.: US 9,863,026 B2
(45) Date of Patent: Jan. 9, 2018

(54) DUAL PHASE STEEL SHEET AND MANUFACTURING METHOD THEREOF

(71) Applicant: NIPPON STEEL & SUMITOMO METAL CORPORATION, Tokyo (JP)

(72) Inventors: Tatsuo Yokoi, Tokyo (JP); Hiroshi Shuto, Tokyo (JP); Eisaku Sakurada, Tokyo (JP); Hiroyuki Okada, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 314 days.

(21) Appl. No.: 14/423,657

(22) PCT Filed: Sep. 26, 2013

(86) PCT No.: PCT/JP2013/076149
§ 371 (c)(1),
(2) Date: Feb. 24, 2015

(87) PCT Pub. No.: WO2014/051005
PCT Pub. Date: Apr. 3, 2014

(65) Prior Publication Data
US 2015/0203949 A1 Jul. 23, 2015

(30) Foreign Application Priority Data
Sep. 26, 2012 (JP) .................. 2012-212783

(51) Int. Cl.
*C22C 38/04* (2006.01)
*C22C 38/06* (2006.01)
(Continued)

(52) U.S. Cl.
CPC .............. *C23C 2/02* (2013.01); *B32B 15/013* (2013.01); *C21D 6/001* (2013.01); *C21D 6/002* (2013.01);
(Continued)

(58) Field of Classification Search
None
See application file for complete search history.

(56) References Cited

U.S. PATENT DOCUMENTS 5,759,297 A 6/1998 Teracher et al.
2002/0179193 A1 12/2002 Yokoi et al.

FOREIGN PATENT DOCUMENTS

EP 0747496 A1 12/1996
JP 2001-303187 A 10/2001
(Continued)

OTHER PUBLICATIONS

Korean Office Action for Korean Application No. 10-2015-7007334, dated Jan. 14, 2016, with a partial English translation.
(Continued)

*Primary Examiner* — Deborah Yee
(74) *Attorney, Agent, or Firm* — Birch, Stewart, Kolasch & Birch, LLP

(57) ABSTRACT

A dual phase steel sheet including: in mass %, C: 0.01 to 0.1%; Mn: 0.2 to 3%; Al: 0.04 to 1.5%; Ti: 0.015 to 0.2%; P: 0.01% or less; S: 0.005% or less; N: 0.01% or less, in which $[Ti]-48/14\times[N]-48/32\times[S]\geq0\%$ is satisfied and when Ex.C $(\%)=[C]-12/48\times\{[Ti]+48/93\times[Nb]-48/14\times[N]-48/32\times[S]\}$ is set, $0.001\leq$Ex.C $(\%)/$fsd $(\%)\leq0.01$ is satisfied, and a balance being composed of Fe and impurities, in which at the position of ¼ thickness of a sheet thickness, a microstructure is a dual phase with its main phase composed of polygonal ferrite precipitation-strengthened by carbide of Ti and its second phase composed of 1 to 10% in area fraction (fsd (%)) of low-temperature transformation products dispersed plurally, and an average crystal diameter of the low-temperature transformation product is 3 to 15 μm (Continued)

and an average value of a distance of closest approach between the low-temperature transformation products is 10 to 20 μm.

12 Claims, 1 Drawing Sheet

(51) Int. Cl.

| | |
|---|---|
| *C22C 38/14* | (2006.01) |
| *C21D 8/02* | (2006.01) |
| *C21D 9/46* | (2006.01) |
| *C23C 2/02* | (2006.01) |
| *C23C 2/06* | (2006.01) |
| *C23C 2/28* | (2006.01) |
| *C22C 38/00* | (2006.01) |
| *C22C 38/02* | (2006.01) |
| *C22C 38/12* | (2006.01) |
| *B32B 15/01* | (2006.01) |
| *C21D 6/00* | (2006.01) |
| *C22C 38/08* | (2006.01) |
| *C22C 38/10* | (2006.01) |
| *C22C 38/16* | (2006.01) |
| *C22C 38/28* | (2006.01) |
| *C22C 38/32* | (2006.01) |

(52) U.S. Cl.
CPC ............ *C21D 6/005* (2013.01); *C21D 6/007* (2013.01); *C21D 6/008* (2013.01); *C21D 8/0205* (2013.01); *C21D 8/0226* (2013.01); *C21D 8/0263* (2013.01); *C21D 9/46* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/28* (2013.01); *C22C 38/32* (2013.01); *C23C 2/06* (2013.01); *C23C 2/28* (2013.01); *C21D 2211/004* (2013.01); *Y10T 428/12799* (2015.01)

(56) References Cited

FOREIGN PATENT DOCUMENTS

| | | | |
|---|---|---|---|
| JP | 2002-322540 | A | 11/2002 |
| JP | 2002-322541 | A | 11/2002 |
| JP | 2003-89848 | A | 3/2003 |
| JP | 2003-193190 | A | 7/2003 |
| JP | 2003-321737 | A | 11/2003 |
| JP | 2003-321738 | A | 11/2003 |
| JP | 2003-321739 | A | 11/2003 |
| JP | 2004-143518 | A | 5/2004 |
| JP | 2004-204326 | A | 7/2004 |
| JP | 2007-63668 | A | 3/2007 |
| JP | 2007-302918 | A | 11/2007 |
| JP | 2010-150581 | A | 7/2010 |
| JP | 2011-12308 | A | 1/2011 |
| JP | 2011-184788 | A | 9/2011 |
| JP | 2011-225935 | A | 11/2011 |
| JP | 2012-12658 | A | 1/2012 |

OTHER PUBLICATIONS

Canadian Office Action, dated Jul. 21, 2016, issued in Canadian Application No. 2,882,333.
Canadian Office Action for Canadian Application No. 2,882,333, dated Mar. 6, 2017.
International Search Report issued in PCT/JP2013/076149, dated Dec. 24, 2013.
Matsumura et al., "Enhancement of Elongation by Retained Austenite in Intercritical Annealed 0.4C-1.5Si-0.8Mn Steel", Transactions ISIJ, 1987, pp. 570-579, vol. 27.
Extended European Search Report, dated May 18, 2016, for European Application No. 13842321.5.
Mexican Office Action, dated Sep. 4, 2017, for corresponding Mexican Application No. MX/a/2015/002803, with English translation.

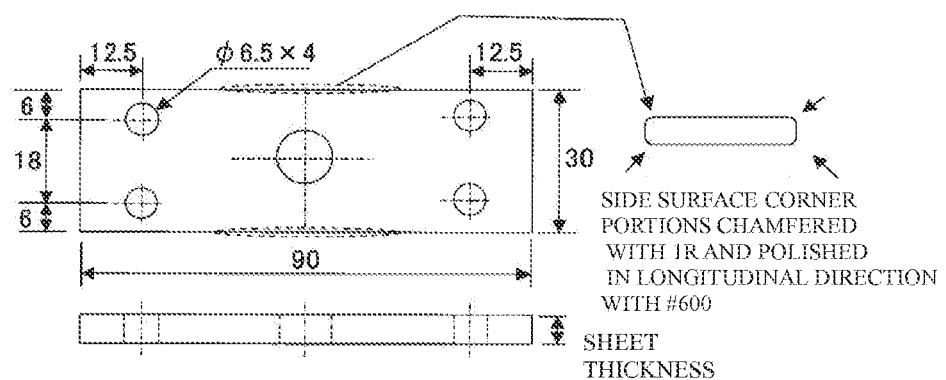

DUAL PHASE STEEL SHEET AND MANUFACTURING METHOD THEREOF

TECHNICAL FIELD

The present invention relates to a dual phase steel sheet composed of ferrite and low-temperature transformation products and a manufacturing method thereof. This application is based upon and claims the benefit of priority of the prior Japanese Patent Application No. 2012-212783, filed on Sep. 26, 2012, the entire contents of which are incorporated herein by reference.

BACKGROUND ART

In recent years, there has been promoted weight reduction of various parts constituting an automobile in order to improve fuel consumption of an automobile. Weight reduction means differ depending on each required performance of the parts, and for example, for a framework part, thickness thinning achieved by increasing strength of a steel sheet is performed, and for a panel part, application of a light metal such as an Al alloy to a steel sheet and the like are performed. However, when compared to steel, the light metal such as an Al alloy is expensive, so that it is mainly applied to luxury automobiles in the real world.

On the other hand, a demand for automobiles is being shifted to emerging countries from developed countries, and from now on, it is expected that weight reduction and price reduction are both achieved. For any parts, it becomes necessary to achieve, of steel, strength increase and weight reduction achieved by thickness thinning.

Aluminum casting and forgings have been advantageous to wheels for passenger vehicles in terms of design. However, even though steel pressed products are used recently as the wheels for passenger vehicles, by devising materials and methods, products having the design equivalent to that of an aluminum wheel are appearing.

Particularly, in addition to excellent fatigue endurance and corrosion resistance that have been required so far in a wheel disc seen by an end user, the design and beautifulness equivalent to those of an aluminum wheel are also required in a steel wheel. Similarly, also in a steel sheet for wheel disc, workability improvement for improving design as a part and surface property improvement for securing beautifulness are required, in addition to the strength increase that achieves thickness thinning, and the fatigue endurance and the corrosion resistance that have been required so far.

As properties that have been required so far in the steel sheet for wheel disc, bulging workability, drawability, and fatigue endurance have been regarded as important in particular. This is because working of a hat portion is challenging among forming steps of the wheel disc and the fatigue endurance is managed by the strictest standard among member properties of the wheel.

At present, in order to emphasize the fatigue endurance of a member as a high-strength hot-rolled steel sheet for wheel disc, ferrite-martensite dual phase steel sheets of 590 MPa grade excellent in fatigue property (what is called Dual Phase steel) have been used. However, the strength level required in these steel sheets is increased to the 780 MPa grade from the 590 MPa grade and the strength tends to further increase.

In Non-Patent Document 1, there has been disclosed a method of securing uniform elongation even with the same strength by turning a microstructure of a steel sheet into a composite-structure such as a Dual Phase steel composed of ferrite and martensite (to be described as DP steel, hereinafter).

On the other hand, the DP steel has been known that local deformability typified by bending forming, hole expansion, and burring is low. This is because a strength difference between ferrite and martensite is large, so that large strain and stress concentration occur in ferrite near martensite with formation and a crack occurs.

Based on this finding, a high-strength steel sheet whose hole expansion ratio is increased by decreasing the strength difference between structures has been developed. In Patent Document 1, there has been proposed a steel sheet in which strength is secured by applying bainite or bainitic ferrite as its main phase to largely improve hole expandability. The steel is designed to be composed of a single structure, and thereby the strain and stress concentration described above are prevented from occurring and a high hole expansion ratio can be obtained.

However, the steel is designed to be composed of a single structure of bainite or bainitic ferrite, and thereby elongation deteriorates greatly and the achievement of elongation and hole expandability cannot be attained.

Further, in recent years, there have been proposed high-strength steel sheets in which ferrite excellent in elongation is used as a structure of a single structure steel and a strength increase is achieved by using carbide of Ti, Mo, or the like (for example, Patent Documents 2 to 4).

However, the steel sheet proposed in Patent Document 2 contains a large amount of Mo. The steel sheet proposed in Patent Document 3 contains a large amount of V. Further, the steel sheet proposed in Patent Document 4 needs to be cooled in the middle of rolling for making crystal grains fine. Therefore, there is a problem that the alloy cost and the manufacturing cost increase. Further, even in this steel sheet, ferrite itself is largely increased in strength, and thereby the elongation deteriorates. The elongation of the single structure steel composed of bainite or bainitic ferrite is excellent, but the elongation-hole expandability balance is not necessarily sufficient.

Further, in Patent Document 5, there has been proposed a dual phase steel sheet in which in a DP steel, bainite is used in place of martensite and a strength difference between structures of ferrite and bainite is decreased, to thereby increase hole expandability.

However, as a result that an area ratio of the bainite structure was increased in order to secure strength, the elongation deteriorated and the elongation-hole expandability balance was not sufficient.

Further, in Patent Documents 7 to 9, there have been also proposed steel sheets in which ferrite in a DP steel is precipitation-strengthened and thereby a strength difference between ferrite and hard structure is decreased.

However, in this technique, Mo is an essential element to cause a problem that the manufacturing cost increases. Further, even though ferrite is precipitation-strengthened, the strength difference between ferrite and martensite being a hard structure is large, resulting in that a high hole expandability improving effect is not obtained.

On the other hand, in order to turn a microstructure into a dual phase of ferrite and martensite, Si is often added to these DP steels for the purpose of promoting ferrite transformation. However, when Si is contained, a tiger stripe scale pattern called a red scale (Si scale) is generated on the surface of the steel sheet, so that it is difficult to apply the DP steel to various steel sheets used for highly-designed wheel discs required to have beautifulness.

In Patent Document 10, there has been disclosed a technique relating to a steel sheet capable of obtaining an excellent balance between elongation and hole expandability by controlling a martensite fraction in a DP steel to 3 to 10% in a steel sheet of 780 MPa grade or higher. However, 0.5% or more of Si is added, thereby making it difficult to avoid the Si scale pattern, so that it is difficult to apply the technique to various steel sheets used for highly-designed wheel discs required to have beautifulness.

With regard to this problem, there has been disclosed a technique of a high-tensile hot-rolled steel sheet capable of suppressing occurrence of red scales by suppressing the added amount of Si to 0.3% or less and further obtaining high strength and excellent stretch flangeability by adding Mo and making precipitates fine (for example, Patent Documents 11 and 12).

However, in steel sheets having had the above-described technique disclosed in Patent Documents 11 and 12 applied thereto, the added amount of Si is about 0.3% or less, but it is difficult to sufficiently suppress occurrence of red scales, and further adding 0.07% or more of Mo being an expensive alloy element is essential, so that there is a problem that the manufacturing cost is high.

Further, in Patent Document 13, there has been disclosed a technique of avoiding occurrence of red scales by defining the upper limit of the content of Si. However, there is no technical disclosure on notch fatigue property.

Further, in Patent Document 14, there has been disclosed a technique of improving a low cycle fatigue property by adding Al. However, there is no technical disclosure on notch fatigue property being a fatigue property under stress concentration.

PRIOR ART DOCUMENT

Patent Document

Patent Document 1: Japanese Laid-open Patent Publication No. 2003-193190
Patent Document 2: Japanese Laid-open Patent Publication No. 2003-089848
Patent Document 3: Japanese Laid-open Patent Publication No. 2007-063668
Patent Document 4: Japanese Laid-open Patent Publication No. 2004-143518
Patent Document 5: Japanese Laid-open Patent Publication No. 2004-204326
Patent Document 6: Japanese Laid-open Patent Publication No. 2007-302918
Patent Document 7: Japanese Laid-open Patent Publication No. 2003-321737
Patent Document 8: Japanese Laid-open Patent Publication No. 2003-321738
Patent Document 9: Japanese Laid-open Patent Publication No. 2003-321739
Patent Document 10: Japanese Laid-open Patent Publication No. 2011-184788
Patent Document 11: Japanese Laid-open Patent Publication No. 2002-322540
Patent Document 12: Japanese Laid-open Patent Publication No. 2002-322541
Patent Document 13: Japanese Patent Publication No. 2007-082567
Patent Document 14: Japanese Laid-open Patent Publication No. 2010-150581

Non-Patent Document

Non-Patent Document 1: O. Matsumura et al, Trans. ISIJ(1987)vol. 27, p. 570

DISCLOSURE OF THE INVENTION

Problems to be Solved by the Invention

The present invention has an object to provide a high-burring workability high-strength dual phase steel sheet having a tensile strength of 540 MPa or higher and having excellent surface property and notch fatigue property and a manufacturing method thereof.

Means for Solving the Problems

The present inventors repeated earnest examinations on the relationship between a structural constitution of a dual phase steel having a high ductility as well as having a high strength and uniform elongation, burring workability, and a notch fatigue property based on the premise of a steel component not containing Si for the purpose of avoiding a Si scale pattern. As a result, they found a method of bringing the uniform elongation, the burring workability, and the notch fatigue property into balance on a high level by controlling a steel component, a dispersion state, shape, size and nanohardness of a low-temperature transformation product being a second phase. That is, as a substitute for Si, Al was appropriately added to avoid a Si scale pattern, and making a structure composite in which polygonal ferrite is set as a main phase and a low-temperature transformation product is set as a second phase was promoted. Further, they learned optimum ranges of a fraction, a size, and the like of the low-temperature transformation product that could achieve the elongation, the burring workability, and the notch fatigue property. Further, they clarified that by devising not only the steel component but also a hot rolling method, these optimum ranges can be obtained with repeatability. The present invention has been made based on such findings, and the gist thereof is as follows.

[1]

A dual phase steel sheet contains:
in mass %,
C: 0.01 to 0.1%;
Mn: 0.2 to 3%;
Al: 0.04 to 1.5%;
Ti: 0.015 to 0.2%;
Si: 0 to 0.5%;
Nb: 0 to 0.06%;
Cu: 0 to 1.2%;
Ni: 0 to 0.6%;
Mo: 0 to 1%;
V: 0 to 0.2%;
Cr: 0 to 2%;
W: 0 to 0.5%;
Mg: 0 to 0.01%;
Ca: 0 to 0.01%;
REM: 0 to 0.1%;
B: 0 to 0.002%;
P: 0.01% or less;
S: 0.005% or less;
N: 0.01% or less, in which [Ti]−48/14×[N]−48/32×[S]≥0% is satisfied and when Ex.C (%)=[C]−12/48×{[Ti]+48/93×[Nb]−48/14×[N]−48/32×[S]} is set, 0.001≤Ex.C (%)/fsd (%)≤0.01 is satisfied, and a balance being composed of Fe and impurities, in which at the position of ¼ thickness of a sheet thickness, a microstructure is a dual phase with its main phase composed of polygonal ferrite precipitation-strengthened by carbide of Ti and its second phase composed of 1 to 10% in area fraction (fsd (%)) of low-temperature transformation products dispersed plurally, and an average crystal diameter of the low-temperature transformation product is 3 to 15 μm and an average value of a distance of closest approach between the low-temperature transformation products is 10 to 20 μm.

[2] The dual phase steel sheet according to claim [1], contains:
in mass %,
Si: 0.02% to 0.5%.

[3] The dual phase steel sheet according to [1] or [2], contains: one or two or more of
in mass %,
Nb: 0.005 to 0.06%;
Cu: 0.02 to 1.2%;
Ni: 0.01 to 0.6%;
Mo: 0.01 to 1%;
V: 0.01 to 0.2%;
Cr: 0.01 to 2%; and
W: 0.01 to 0.5%.

[4] The dual phase steel sheet according to any one of [1] to [3], contains:
one or two or more of
in mass %,
Mg: 0.0005 to 0.01%;
Ca: 0.0005 to 0.01%; and
REM: 0.0005 to 0.1%.

[5] The dual phase steel sheet according to any one of claims [1] to [4], contains:
in mass %,
B: 0.0002 to 0.002%.

[6] The dual phase steel sheet according to any one of [1] to [5], in which
galvanizing is performed on its surface.

[7] A manufacturing method of a dual phase steel sheet includes:
on a slab containing:
in mass %,
C: 0.01 to 0.1%;
Mn: 0.2 to 3%;
Al: 0.04 to 1.5%;
Ti: 0.015 to 0.2% or less;
Si: 0 to 0.5%;
Nb: 0 to 0.06%;
Cu: 0 to 1.2%;
Ni: 0 to 0.6%;
Mo: 0 to 1%;
V: 0 to 0.2%;
Cr: 0 to 2%;
W: 0 to 0.5%;
Mg: 0 to 0.01%;
Ca: 0 to 0.01%;
REM: 0 to 0.1%;
B: 0 to 0.002%;
P: 0.01% or less;
S: 0.005% or less;
N: 0.01% or less, in which [Ti]−48/14×[N]−48/32×[S]≥0% is satisfied and when Ex.C (%)=[C]−12/48×{[Ti]+48/93×[Nb]−48/14×[N]−48/32×[S]} is set, 0.001≤Ex.C (%)/fsd (%)≤0.01 is satisfied, and a balance being composed of Fe and impurities, performing heating to a temperature $SRT_{min}$ (° C.) or higher, which is defined by Expression (1) below, and then in hot rolling, performing rough rolling at a reduction ratio of 20% or more in a temperature zone of not lower than 1050° C. nor higher than 1150° C. for at least one pass, and then starting finish rolling within 150 seconds in a temperature zone of 1000° C. or higher and lower than 1080° C., and completing finish rolling with the total reduction ratio for plural passes of not less than 75% nor more than 95% in a temperature zone of not lower than an Ar3 transformation point temperature+50° C. nor higher than 1000° C.; and within 3 seconds, performing cooling down to lower than the Ar3 transformation point temperature at an average cooling rate of 15° C./sec or more, and next performing cooling down to a temperature zone of higher than 600° C. at an average cooling rate of 10° C./sec or less for a time period of 1 second or longer and shorter than 100 seconds, and next performing cooling down to a temperature zone of 350° C. or lower at a cooling rate of 15° C./sec or more, and performing coiling.

$$SRT_{min}=10780/\{5.13-\log([Ti]\times[C])\}-273 \qquad \text{Expression (1)}$$

[8] The manufacturing method of the dual phase steel sheet according to [7], further includes:
in the hot rolling, performing rough rolling at a reduction ratio of 20% or more in a temperature zone of not lower than 1050° C. nor higher than 1150° C. for plural passes, in which the total reduction ratio of the rough rolling is not less than 60% nor more than 90%.

[9] The manufacturing method of the dual phase steel sheet according to [7] or [8], further includes:
performing cooling down to a temperature zone of 100° C. or lower and performing coiling.

[10] The manufacturing method of the dual phase steel sheet according to any one of [7] to [9], in which
in the performing the cooling down to the temperature zone of higher than 600° C. at an average cooling rate of 10° C./sec or less for a time period of 1 second or longer and shorter than 100 seconds, when a total cumulative diffusion length $L_{total}$ of Ti in ferrite is expressed by Expression (3) below by adding up a diffusion length L of Ti in ferrite expressed by Expression (2) below for a very short time Δt/sec from a cooling completing temperature to coiling, $0.15 \leq L_{total} \leq 0.5$ is satisfied.

$$L=\sqrt{D(T+273)t} \qquad \text{Expression (2)}$$

$$L_{total}=\Sigma\sqrt{(D(T+273)\Delta t)} \qquad \text{Expression (3)}$$

Here, D(T+273) is a volume diffusion coefficient at T° C.
t is a diffusion time period.
D(T) is expressed by Expression (4) below using a diffusion coefficient D0 of Ti, an activation energy Q, and a gas constant R.

$$D(T)=D0\times\text{Exp}(-Q/R\cdot(T+273)) \qquad \text{Expression (4)}$$

[11] The manufacturing method of the dual phase steel sheet according to any one of [7] to [10], in which
in the performing the cooling down to the temperature zone of higher than 600° C. at an average cooling rate of 10° C./sec or less for a time period of 1 second or longer and shorter than 100 seconds, a steel sheet is immersed in a galvanizing bath to galvanize its surface.

[12] The manufacturing method of the dual phase steel sheet according to [11], further includes:
on a galvanized dual phase steel sheet, performing an alloying treatment in a temperature range of 450 to 600° C.

Effect of the Invention

According to the present invention, it is possible to obtain a high-strength dual phase steel sheet excellent in uniform elongation, burring workability, and notch fatigue property, and further excellent also in surface property as well as having a tensile strength of 540 MPa or higher, and industrial contribution is extremely significant.

BRIEF DESCRIPTION OF THE DRAWINGS

FIG. 1 is a view showing a notched fatigue test piece.

MODE FOR CARRYING OUT THE INVENTION

A dual phase steel sheet is a steel sheet in which hard low-temperature transformation products typified by martensite are dispersed in soft ferrite, and achieves high uniform elongation as well as being high in strength. However, at the time of deformation, strain and stress concentration caused by a strength difference between ferrite and martensite occur, and voids to cause ductile fracture are likely to be generated to grow, so that it is general that local deformability relating to burring workability is quite low.

On the other hand, with regard to a notch fatigue property to evaluate a fatigue property under stress concentration, it is known that most of a fracture life is derived from propagation of a fatigue crack. In the dual phase steel in which hard low-temperature transformation products typified by martensite are dispersed in soft ferrite, it is conceivable that when a fatigue crack propagates through soft ferrite, the hard low-temperature transformation product becomes an obstacle to the fatigue crack propagation, propagation speed decreases, and the notch fatigue property improves.

However, detailed examinations on a fraction, size, and the like of the low-temperature transformation product in the dual phase steel sheet, generation and growth behavior of voids causing the ductile fracture, and the propagation speed of a fatigue crack are not conducted. The optimal microstructure capable of achieving improvement in the local deformability relating to the burring workability of the dual phase steel sheet and decrease in the propagation speed of a fatigue crack is not necessarily definite.

Further, components and a manufacturing method of a steel sheet capable of satisfying all of avoidance of a Si scale pattern relating to a surface property of a steel sheet for the purpose of achieving the design and beautifulness equivalent to those of an aluminum wheel with a steel wheel, security of post-coating corrosion resistance, burring workability, and notch fatigue property, are not necessarily definite.

Thus, the present inventors repeated earnest examinations on the relationship between a structural constitution of a dual phase steel having a high ductility as well as having a high strength and uniform elongation, burring workability, and a notch fatigue property based on the premise of a steel component not containing Si for the purpose of avoiding a Si scale pattern. As a result, they found a method of bringing the uniform elongation, the burring workability, and the notch fatigue property into balance on a high level by controlling the steel component, the dispersion state, shape, size and nanohardness of the low-temperature transformation product being a second phase.

Concretely, the content of Si was controlled to 0.5% or less, to thereby avoid the Si scale pattern. Further, in order to bring the area fraction (fsd (%)), size and the like of the low-temperature transformation product into appropriate ranges, the amount of Ex.C was controlled in a range satisfying $0.001 \leq \text{Ex.C}\,(\%)/\text{fsd}\,(\%) \leq 0.01$ (being Ex.C (%)= $[C]-12/48 \times \{[Ti]+48/93 \times [Nb]-48/14 \times [N]-48/32 \times [S]\}$, here). Further, at the position of ¼ thickness of a sheet thickness, a microstructure was set to a dual phase with its main phase composed of polygonal ferrite precipitation-strengthened by carbide of Ti and its second phase composed of 1 to 10% in area fraction (fsd (%)) of low-temperature transformation products dispersed plurally. Then, an average crystal diameter of the aforesaid low-temperature transformation product was set to 3 to 15 μm, and an average value of a distance of closest approach between the low-temperature transformation products was set to 10 to 20 μm. As a result, they made clear that it is possible to bring the uniform elongation, the buffing workability, and the notch fatigue property into balance on a high level.

As a test method by which the difference of burring workability appears clearly, a hole expanding test is proposed. A hole expansion value obtained by this test is widely used as an index to evaluate the local deformability relating to burring workability. Occurrence and progress of a crack in hole expanding are caused by ductile fracture with generation, growth, and connection of voids set as elementary steps. In a structure having a large strength difference as is the dual phase steel sheet, high strain and stress concentration occur due to hard low-temperature transformation products, so that voids occur to grow easily and the hole expansion value is low.

However, when the relationship between the structure and the generation and growth behavior of voids and the relationship between them and the hole expandability were examined in detail, it became clear that depending on the dispersion state of low-temperature transformation product being a hard second phase, the generation, growth, and connection of voids are sometimes delayed, to thus make it possible to obtain an excellent hole expansion value.

Concretely, when of the low-temperature transformation products dispersed in an island shape, the area fraction fsd is 10% or less, the average crystal diameter is 15 μm or less, and the average value of the distance of closest approach between the low-temperature transformation products is 20 μm or less, the generation, growth, and connection of voids are delayed, to thus make it possible to obtain an excellent hole expansion value.

This is because when the low-temperature transformation products are made small and the number per unit volume is decreased, the low-temperature transformation products being occurrence sites of voids themselves or vicinities of boundaries between ferrite and the low-temperature transformation products are decreased and respective intervals between the low-temperature transformation products are increased, and thereby voids are not easily connected and the growth of voids is suppressed. Further, hardness of the low-temperature transformation product is limited to a certain range, and thereby local occurrence of voids being an initial stage of deformation can be avoided and non-uniform growth of voids is suppressed.

On the other hand, the notch fatigue property can be improved by dispersing the hard low-temperature transformation product and decreasing the propagation speed of a fatigue crack. In the case of the dual phase steel, it is known that the propagation speed of a fatigue crack changes depending on the dispersion state of the low-temperature transformation product being a hard second phase, and by optimizing the dispersion state, the effect is exhibited.

Concretely, as long as of the low-temperature transformation products dispersed in an island shape, the area fraction fsd is 1% or more, the average crystal diameter is 3 µm or more, and the average value of the distance of closest approach between the low-temperature transformation products is 10 µm or more, a fatigue crack to go through soft ferrite stays at or bypasses the low-temperature transformation product being a hard second phase, and thereby the propagation speed of the fatigue crack decreases and notch fatigue strength improves.

Further, as long as the low-temperature transformation products being a second phase have the average crystal diameter of 3 to 15 µm and have the average value of the distance of closest approach therebetween of 10 to 20 µm, and are in a state of being dispersed in an island shape in an area fraction of 1 to 10%, excellent uniform elongation that the dual phase steel exhibits can be obtained.

In the foregoing, the characteristics of the present invention have been explained in principle, and there will be next explained requirements defining the present invention and preferable requirements sequentially. First, components of the present invention will be explained in detail. Incidentally, with regard to the component, % means mass %.

C: 0.01 to 0.1%

C is one of important elements in the present invention. C not only forms low-temperature transformation products to contribute to strength by structure strengthening, but also forms precipitates with Ti to contribute to strength by precipitation strengthening. However, when C is less than 0.01%, these effects for securing the strength of 540 MPa or higher cannot be obtained. When greater than 0.1% of C is contained, an area ratio of the low-temperature transformation product being a hard second phase is increased and the hole expandability decreases. Thus, the content of C is set to 0.01% to 0.1%.

Further, as long as 0.001≤Ex.C (%)/fsd (%)≤0.01 (Ex.C (%)=[C]−12/48×{[Ti]+48/93×[Nb]−48/14×[N]−48/32×[S]}) is satisfied on the condition that the area fraction of the second phase is set to fsd (%), the dispersion state, hardness, and the like of the low-temperature transformation product being a hard second phase are optimized, the generation, growth, and connection of voids are delayed, an excellent hole expansion value can be obtained, and the tip of a fatigue crack stays or makes a detour, and thereby the propagation speed of the fatigue crack decreases and excellent notch fatigue strength can be obtained. Incidentally, in the expression expressing Ex.C (%), [C] is the content of C (mass %), [Ti] is the content of Ti (mass %), [Nb] is the content of Nb (mass %), [N] is the content of N (mass %), and [S] is the content of S (mass %).

Mn: 0.2 to 3%

Mn is not only an element involved in strengthening of ferrite, but also an element expanding an austenite region temperature to a low temperature side to expand a two-phase region temperature zone of ferrite and austenite with an increase in its content. In order to obtain the dual phase steel of the present invention, it is necessary to promote two-phase separation of ferrite and austenite during cooling after finish rolling. In order to obtain the effect, 0.2% or more of Mn needs to be contained. On the other hand, when Mn is contained in excess of 3%, slab cracking significantly occurs during casting, so that the content is set to 3% or less.

Further, when greater than 2.5% of Mn is contained, hardenability increases too much, resulting in that an intended microstructure cannot be obtained by an ordinary method. In order to obtain the intended microstructure, air-cooling and holding for a long time is required for precipitating ferrite during cooling after finish rolling, and productivity decreases, so that the content is desirably 2.5% or less. It is further desirably 2.2% or less. Further, when elements other than Mn are not added sufficiently for the purpose of suppressing occurrence of hot cracking caused by S, the amount of Mn that makes the content of Mn ([Mn]) and the content of S ([S]) satisfy [Mn]/[S]≥20 in mass % is desirably contained.

Al: 0.04 to 1.5%

Al is involved in generation of ferrite similarly to Si to be one of important elements in the present invention as well as being a deoxidizing element. Al is also an element that with an increase in its content, expands a ferrite region temperature to a high-temperature side to expand a two-phase region temperature zone of ferrite and austenite, so that it is actively contained as a substitute for Si in the present invention. In order to obtain the effect, 0.04% or more of Al needs to be contained, but when it is contained in excess of 1.5%, the ferrite region temperature is expanded to the high-temperature side too much to thereby make it difficult to complete finish rolling in an austenite region, and worked ferrite remains in a product sheet and ductility deteriorates. Thus, the content of Al is set to not less than 0.04% nor more than 1.5%. Further, when greater than 1% of Al is contained, there is caused a risk that non-metal inclusions such as alumina are increased to deteriorate local ductility, so that it is desirably 1% or less.

Ti: 0.015 to 0.2%

Ti is one of the most important elements in the present invention. Simultaneously with ferrite transformation progressing during cooling after completion of hot rolling, the rest of Ti after having been precipitated as TiN in an austenite region during hot rolling finely precipitates as carbide such as TiC to precipitation strengthen ferrite grains of the dual phase steel of the present invention, and thereby strength is improved. In order to obtain this effect, Ti that is 0.015% or more and satisfies [Ti]−48/14×[N]−48/32×[S]≥0% needs to be contained.

On the other hand, even when greater than 0.2% of Ti is contained, these effects are saturated. Further, 0.001≤Ex.C (%)/fsd (%)≤0.01 (Ex.C (%)=[C]−12/48×{[Ti]+48/93×[Nb]−48/14×[N]−48/32×[S]}) is set on the condition that the area fraction of the second phase is set to fsd (%), and thereby the dispersion state, hardness, and the like of the low-temperature transformation product being a hard second phase are optimized, the generation, growth, and connection of voids are delayed, and an excellent hole expansion value can be obtained. Further, the tip of a fatigue crack stays at the low-temperature transformation product or bypasses the low-temperature transformation product, and thereby the propagation speed of the fatigue crack decreases and excellent notch fatigue strength can be obtained. Further, when greater than 0.15% of Ti is contained, there is caused a risk that a tundish nozzle is likely to be clogged at the time of casting, so that it is desirably 0.15% or less.

The steel used for the steel sheet of the present invention contains the above elements as essential components, and further may also contain Si, Nb, Cu, Ni, Mo, V, Cr, W, Mg, Ca, REM, and B according to need. These respective elements will be described below.

Si: 0 to 0.5%

In the present invention, Si is not essential. Si is involved in generation of ferrite as well as being a deoxidizing element, and is an element that with an increase in its content, expands a ferrite region temperature to a high-temperature side to expand a two-phase region temperature zone of ferrite and austenite. In order to obtain the dual phase steel of the present invention, Si is desirably contained originally. However, Si noticeably generates a tiger stripe Si scale pattern on the surface of the steel sheet to deteriorate surface property significantly. Further, there is sometimes a case that it extremely decreases productivity of a scale removing step (pickling and the like) on a precise adjustment line.

When greater than 0.07% of Si is contained, the Si scale pattern begins to be found here and there on the surface of the steel sheet. When it is greater than 0.5%, the surface property deteriorates significantly and the to productivity of a pickling step deteriorates extremely. Even though any scale removing method is performed, a conversion treatment property deteriorates and post-coating corrosion resistance decreases. Thus, the content of Si is set to 0.5% or less.

On the other hand, Si is an element having an effect of suppressing occurrence of scale-based defects such as scales and spindle scales, and when 0.02% or more is contained, the effect can be obtained. However, even though Si is contained in excess of 0.1%, the effect is saturated, and furthermore the conversion treatment property deteriorates and the post-coating corrosion resistance decreases. Thus, when Si is contained, the content of Si is set to not less than 0.02% nor more than 0.5%, and is desirably 0.1% or less. Further, in order to make the Si scale patterns zero, the content of Si is desirably 0.07% or less. However, the scale-based defects such as scales and spindle scales vary in grade depending on needs, and Si may also be less than 0.02%. A steel component not containing Si is also in the range of the present invention.

One or two or more of Nb, Cu, Ni, Mo, V, Cr, and W

In the present invention, Nb, Cu, Ni, Mo, V, Cr, and W are not essential. Nb, Cu, Ni, Mo, V, Cr, and W are elements effective for improving the strength of the steel sheet by precipitation-strengthening or solid-solution strengthening. Therefore, one or two or more of Nb, Cu, Ni, Mo, V, Cr, and W are contained according to need. When the content of Nb is less than 0.005%, the content of Cu is less than 0.02%, the content of Ni is less than 0.01%, the content of Mo is less than 0.01%, the content of V is less than 0.01%, the content of Cr is less than 0.01%, and the content of W is less than 0.01%, the above-described effect cannot be obtained sufficiently. Further, even when greater than 0.06% of the content of Nb, greater than 1.2% of the content of Cu, greater than 0.6% of the content of Ni, greater than 1% of the content of Mo, greater than 0.2% of the content of V, greater than 2% of the content of Cr, and greater than 0.5% of the content of W are each added, the above-described effect is saturated and economic efficiency decreases.

Thus, when these are contained according to need, the content of Nb is desirably not less than 0.005% nor more than 0.06%, the content of Cu is desirably not less than 0.02% nor more than 1.2%, the content of Ni is desirably not less than 0.01% nor more than 0.6%, the content of Mo is desirably not less than 0.01% nor more than 1%, the content of V is desirably not less than 0.01% nor more than 0.2%, the content of Cr is desirably not less than 0.01% nor more than 2%, and the content of W is desirably not less than 0.01% nor more than 0.5%.

One or two or more of Mg, Ca, and REM

In the present invention, Mg, Ca, and REM are not essential. Mg, Ca, and REM (rare-earth element) are elements that control form of a non-metal inclusion to be a starting point of fracture and to cause deterioration of workability and improve workability. Therefore, one or two or more of Mg, Ca, and REM are contained according to need. Even when less than 0.0005% of each of Ca, REM, and Mg is contained, the above-described effect is not exhibited. Further, even when the content of Mg is set to greater than 0.01%, the content of Ca is set to greater than 0.01%, and the content of REM is set to greater than 0.1%, the above-described effect is saturated and economic efficiency decreases.

Thus, when these are contained according to need, the content of Mg is desirably not less than 0.0005% nor more than 0.01%, the content of Ca is desirably not less than 0.0005% nor more than 0.01%, and the content of REM is desirably not less than 0.0005% nor more than 0.1%. Incidentally, in the present invention, REM refers to an element of La and the lanthanide series, is often added in misch metal, and contains elements of the series such as La and Ce in a complex form. Metals La and Ce may also be contained.

B: 0.0002 to 0.002%

In the present invention, B is not essential. B has an effect of increasing hardenability to increase a structural fraction of a low-temperature transformation generating phase being a hard phase, to thus be contained according to need. However, when B is less than 0.0002%, the effect cannot be obtained, and even though B is contained in excess of 0.002%, the effect is saturated. Therefore, the content of B is desirably not less than 0.0002% nor more than 0.002%. On the other hand, B is an element that causes concern of slab cracking in a cooling step after continuous casting, and from this point of view, the content is desirably 0.0015% or less. That is, it is desirably not less than 0.001% nor more than 0.0015%.

With regard to the steel component of a hot-rolled steel sheet of the present invention, its balance other than the above-described elements is Fe and impurities. As the impurities, one contained in a raw material of ore, scrap, and the like and one contained in a manufacturing step can be exemplified. It is allowable that respective impurity elements are contained as necessary in a range where the operation and effect of the present invention are not inhibited.

P: 0.01% or less

P is an impurity element, and when it exceeds 0.01%, segregation to crystal grain boundaries becomes noticeable, grain boundary embrittlement is promoted, and local ductility deteriorates. Further, embrittlement of a welded portion also becomes noticeable, so that the upper limit is set to 0.01% or less. The lower limit value of P is not defined in particular, but setting it to less than 0.0001% is economically disadvantageous.

S: 0.005% or less

S is an impurity element, and adversely affects weldability and manufacturability during casting and manufacturability during hot rolling, so that the upper limit is set to 0.005% or less. Further, when S is contained excessively, coarse MnS is formed to decrease hole expandability, so that for improvement in hole expandability, the content is preferably decreased. The lower limit value of S is not defined in particular, but setting it to less than 0.0001% is disadvantageous economically, so that this value is preferably set to the lower limit value.

N: 0.01% or less

N is an impurity element to be mixed inevitably at the time of refining of steel, and is an element to form nitride combined with Ti, Nb, or the like. When the content of N is greater than 0.01%, this nitride precipitates at relatively high temperature, so that crystal grains are likely to become coarse, and the coarse crystal grain might become a starting point of a burring crack. Further, this nitride is preferably less in order to effectively use Nb and Ti as will be described later. Thus, the upper limit of the content of N is set to 0.01%.

Incidentally, when the content of N is greater than 0.006% in applying the present invention to a member in which aging deterioration becomes a problem, the aging deterioration becomes severe, so that it is desirably 0.006% or less. Further, when the present invention is applied to a member based on the premise that it is allowed to stand at room temperature for two weeks or longer after manufacture, to then be subjected to working, the content of N is desirably 0.005% or less in view of aging deterioration measures. Further, when it is considered that a member is allowed to stand under a summer high-temperature environment or it is used under an environment with export to regions located over the equator by ships, vessels, and the like, the content of N is desirably less than 0.004%.

As the other impurities, 1% or less in total of Zr, Sn, Co, and Zn may also be contained. However, Sn is desirably 0.05% or less because a flaw might occur at the time of hot rolling.

Subsequently, the microstructure of the dual phase steel sheet of the present invention will be explained in detail. The microstructure of the dual phase steel sheet of the present invention is limited as follows.

At the position of ¼ thickness of a sheet thickness, the microstructure is a dual phase with its main phase composed of polygonal ferrite precipitation-strengthened by carbide of Ti and its second phase composed of 1 to 10% in area fraction (fsd (%)) of low-temperature transformation products dispersed plurally. An average crystal diameter of the aforesaid low-temperature transformation product is 3 to 15 μm. An average value of a distance of closest approach between the low-temperature transformation products is 10 to 20 Incidentally, the microstructure is specified at the position of ¼ thickness of the sheet thickness where average characteristics appear.

Ferrite is the most important structure for securing uniform elongation. In order to obtain the strength of 540 MPa grade or higher even when the area fraction of the low-temperature transformation product being a hard second phase is 10% or less, the ferrite structure needs to be strengthened by precipitation strengthening. Further, in order to secure elongation, it is important that the main phase of the microstructure is not bainitic ferrite having a high dislocation density but polygonal ferrite having a low dislocation density and having sufficient ductility. Thus, the main phase of the steel of the present invention is set to polygonal ferrite precipitation-strengthened by carbide of Ti. Incidentally, the carbide of Ti to be said here is a compound having Ti and C contributing to precipitation strengthening of the ferrite structure as its main component, and it is also acceptable to contain, for example, N, V, Mo, and the like in addition to Ti and C.

As long as the component is fixed, the average grain diameter and the density (piece/cm3) of precipitates containing TiC are substantially inversely-correlated. In order for an improved margin of the strength by precipitation strengthening to become 100 MPa or higher in terms of tensile strength, of the precipitates containing TiC, the average grain diameter needs to be 3 nm or less and the density needs to be $1 \times 10^{16}$ pieces/cm$^3$ or more.

In the present invention, the low-temperature transformation product being a hard second phase is mainly martensite or bainite (aB) not containing coarse carbide between laths. However, it is allowable to contain less than 3% in total in area ratio of retained austenite (yr) and Martensite-Austenite constituent (MA). Further, the martensite to be said in the present invention is fresh martensite (M) when coiling is performed in a temperature zone of 100° C. or lower where a diffusion speed of carbon is sufficiently slow. It is tempered martensite (tM) when a coiling temperature is higher than 100° C. and an Ms point (an Ms point of remaining austenite obtained after ferrite transformation progresses during cooling after finish rolling) or lower. The low-temperature transformation product in the latter case is a structure mixed with tempered martensite and bainite.

The ratio of tempered martensite and bainite of this mixed structure (low-temperature transformation product in the latter case) is affected by the coiling temperature and the relative relationship between the coiling temperature and the above-described Ms point temperature. Incidentally, when the Ms point is lower than 350° C., most of the low-temperature transformation product is bainite not containing coarse carbide between laths that is transformed at higher than the Ms point and 350° C. or lower. However, it is metallographically difficult to distinguish tempered martensite and bainite to be said here, and in the present invention, these are referred to as tempered martensite (tM).

The low-temperature transformation product needs to be dispersed in an island shape at a corner, an edge, and a grain boundary of a ferrite grain. This is because with regard to ductile fracture thought to be involved in burring workability, in a mechanism in which voids occur and then grow to be connected, the shape of the low-temperature transformation product itself thought to be an occurrence site of a void is an island shape, and thereby stress concentration is relaxed and the occurrence of voids causing fracture of the low-temperature transformation product is suppressed.

Incidentally, the island shape indicates a state where low-temperature transformation products are not arranged continuously in an aligned manner, and further the individual shape of them is desirably a shape close to a sphere with few stress concentration places. As long as the average crystal diameter of the low-temperature transformation product is 3 to 15 μm and the average value of the distance of closest approach between the low-temperature transformation products is 10 to 20 μm, the low-temperature transformation products each have an appropriate size and are appropriately dispersed to be in an "island shape."

Further, the low-temperature transformation product being a hard second phase is an important structure in terms of securing uniform elongation. When the area fraction (fsd (%)) of the low-temperature transformation products dispersed in an island shape becomes less than 1%, it becomes difficult to secure 15% or more of uniform elongation at the 540 MPa grade, for example. Further, an effect of delaying the propagation of a fatigue crack is lost. On the other hand, when it becomes greater than 10%, the intervals between the low-temperature transformation products thought to be occurrence sites of voids become short, voids are likely to be connected, ductile fracture is likely to be caused, and the burring workability deteriorates. Therefore, the area fraction (fsd (%)) of the low-temperature transformation product in the microstructure is limited to 1 to 10%.

The average crystal diameter of the low-temperature transformation product needs to be limited to 3 to 15 μm in terms of circle equivalent diameter. This is because when the average crystal diameter of the low-temperature transformation product is less than 3 μm, the effect that the low-temperature transformation product becomes an obstacle to the propagation of a fatigue crack to delay the propagation speed is lost, and when it is greater than 15 μm, the shape becomes complex naturally, stress concentration portions are generated, fracture of a coarse low-temperature transformation product is caused early, and local ductile fracture caused by occurrence of voids adversely affects burring workability. It is desirably 12 μm or less.

Further, the average value of the distance of closest approach between the low-temperature transformation products needs to be limited to 10 to 20 μm. When the average value of the distance of closest approach between the low-temperature transformation products is less than 10 μm, the intervals between the low-temperature transformation products become short, voids are likely to be connected, ductile fracture is likely to be caused, and the burring workability deteriorates. On the other hand, when the average value of the distance of closest approach between the low-temperature transformation products is greater than 20 μm, a fatigue crack selectively propagates through soft polygonal ferrite, and the effect of delaying the propagation of a fatigue crack is lost.

The average nanohardness of the low-temperature transformation product is desirably 7 to 18 GPa. This is because when the average nanohardness is less than 7 GPa, a hardness difference between the low-temperature transformation product and a soft ferrite phase is decreased and excellent uniform elongation being the characteristic of the dual phase steel is not exhibited. On the other hand, when it is greater than 18 GPa, the hardness difference between the low-temperature transformation product and a soft ferrite phase is increased by contraries, and voids occur locally at the initial stage of deformation, and thus ductile fracture is likely to develop and local deformability decreases. Further, a nanohardness range becomes 1.2 GPa or less in terms of standard deviation, and thereby the local occurrence of voids at the initial stage of deformation is suppressed.

Sequentially, there will be explained a manufacturing method of s steel sheet of the present invention.

In the present invention, a manufacturing method of a steel billet (slab) having the above-described components to be performed before a hot rolling step is not limited in particular. That is, as a manufacturing method of a steel billet (slab) having the above-described components, it may also be set that subsequently to a melting step by a shaft furnace, a converter, an electric furnace, or the like, component adjustment is variously performed so as to obtain intended component contents in a secondary refining step, and next a casting step is performed by normal continuous casting, casting by an ingot method, or a method of thin slab casting or the like. Incidentally, scrap may also be used for a raw material. Further, when a slab is obtained by continuous casting, an intact high-temperature cast slab may be directly transformed to hot rolling, or the slab may also be hot rolled after being cooled down to room temperature to then be reheated in a heating furnace.

The slab obtained by the above-described manufacturing method is heated in a heating furnace at a minimum slab reheating temperature (=$SRT_{min}$) or higher, which is calculated based on Expression (1), in a slab heating step before hot rolling.

$$SRT_{min}=10780/\{5.13-\log([Ti]\times[C])\}-273 \qquad \text{Expression (1)}$$

When it is lower than this temperature, carbonitride of Ti is not sufficiently melted in a parent material. In this case, it is not possible to obtain an effect that strength is improved by using precipitation strengthening obtained by fine precipitation of Ti as carbide during cooling after completion of finish rolling or after coiling. Thus, the heating temperature in the slab heating step is set to the minimum slab reheating temperature (=$SRT_{min}$) or higher, which is calculated in Expression (1). Incidentally, when the heating temperature is lower than 1100° C., operational efficiency is significantly impaired in terms of a schedule, so that the heating temperature is desirably 1100° C. or higher.

Further, a heating time in the slab heating step is not defined in particular, but in order to sufficiently promote the melting of carbonitride of Ti, after the temperature reaching the above-described heating temperature, the slab is desirably held for 30 minutes or longer. Further, when the slab is sufficiently uniformly heated in a thickness direction of the slab, it is desirably held for 60 minutes or longer. On the other hand, in terms of a decrease in yield caused by scale off, it is 240 minutes or shorter. However, when the cast slab obtained after casting is directly transferred to be rolled in a high temperature state, the above is not applied.

After the slab heating step, on the slab extracted from the heating furnace, a rough rolling step of hot rolling is started with no waiting time in particular, and a rough bar is obtained. In this rough rolling step, rough rolling at a rolling ratio of at least 20% or more needs to be performed for at least one pass in a temperature zone of not lower than 1050° C. nor higher than 1150° C.

When a rough rolling completing temperature is lower than 1050° C., hot deformation resistance during the rough rolling increases, resulting in that operation of the rough rolling might be damaged. When it is higher than 1150° C., secondary scales to be generated during the rough rolling grow too much, resulting in that descaling to be performed later and removing scales in finish rolling might be difficult to be performed.

Further, unless the rolling at a rolling ratio of 20% or more is performed in the rough rolling in the temperature zone, refining of crystal grains using working and subsequent recrystallization of austenite, and resolution of anisotropy caused by a solidified structure cannot be expected. Thereby, transformation behavior after finish rolling is affected, the shape of the low-temperature transformation product being a second phase in the microstructure of the dual phase steel sheet changes to a film shape from an island shape, and the burring workability deteriorates. Further, when the cast slab obtained after casting is directly transferred to be rolled in a high temperature state, a cast structure remains, and the shape change of the low-temperature transformation product being a second phase to the film shape might be noticeable.

The number of rolling passes in the rough rolling is preferably plural passes, which is two passes or more. When plural passes are applied, working and recrystallization in austenite are performed repeatedly and average austenite grains before finish rolling are refined to 100 μm or less, resulting in that the average grain diameter of the low-temperature transformation product being a hard second phase is made 12 μm or less stably.

Further, the total reduction ratio in the rough rolling is preferably 60% or more. When the total reduction ratio is less than 60%, the above-described effect of refining austenite grains cannot be obtained sufficiently. However, even when the total reduction ratio in the rough rolling is greater than 90%, the effect is saturated and further the number of passes is increased to impede productivity, and a temperature decrease might be caused. Further, due to the similar reason, the number of passes is desirably 11 or less.

Finish rolling is performed after completion of the rough rolling. The time period until start of finish rolling after completion of the rough rolling is within 150 seconds.

When this time period is longer than 150 seconds, in the rough bar, Ti in austenite precipitates as coarse carbide of TiC. As a result, the amount of TiC to finely precipitate in ferrite at the time of austenite/ferrite transformation during cooling to be performed later or at the time of completion of ferrite transformation after coiling and to contribute to strength by precipitation strengthening decreases and the strength decreases. Furthermore, grain growth of austenite progresses and thereby the average austenite grains before finish rolling become coarse to be greater than 100 μm, resulting in that the average grain diameter of the low-temperature transformation product being a hard second phase is sometimes made greater than 15 μm.

On the other hand, the lower limit value of the time period until start of finish rolling after completion of the rough rolling does not have to be limited in particular. However, when it is shorter than 30 seconds, a finish rolling start temperature does not decrease to lower than 1080° C. unless a special cooling device is used, and blisters to be a starting point of scales and spindle scale defects occur between the surface of a base iron of the steel sheet and scales before finish rolling and during passes, so that these scale defects might be likely to be generated. Thus, it is desirably 30 seconds or longer.

A rolling start temperature of the finish rolling is set to 1000° C. or higher and lower than 1080° C.

When this temperature is lower than 1000° C., Ti precipitates in austenite as coarse carbide of TiC by strain-induced precipitation during the finish rolling. As a result, the amount of TiC to finely precipitate in ferrite at the time of austenite/ferrite transformation during cooling to be performed later or at the time of completion of ferrite transformation after coiling and to contribute to strength by precipitation strengthening decreases and the strength decreases.

On the other hand, when this temperature is higher than 1080° C., blisters to be a starting point of scales and spindle scale defects occur between the surface of a base iron of the steel sheet and scales before finish rolling and during passes, so that these scale defects might be likely to be generated.

A finish rolling completing temperature is set to not lower than an Ar3 transformation point temperature+50° C. nor higher than 1000° C.

The Ar3 transformation point temperature is simply expressed by, for example, the following calculation expression in relation to the steel components. That is, it is described by Expression (5) below.

$$Ar3=910-310\times[C]+25\times\{[Si]+2\times[Al]\}-80\times[Mn_{eq}] \quad \text{Expression (5)}$$

Here, when B is not added, $[Mn_{eq}]$ is expressed by Expression (6) below.

$$[Mn_{eq}]=[Mn]+[Cr]+[Cu]+[Mo]+[Ni]/2+10([Nb]-0.02) \quad \text{Expression (6)}$$

Further, when B is added, $[Mn_{eq}]$ is expressed by Expression (7) below.

$$[Mn_{eq}]=[Mn]+[Cr]+[Cu]+[Mo]+[Ni]/2+10([Nb]-0.02)+1 \quad \text{Expression (7)}$$

Incidentally, [C] is the content of C (mass %), [Si] is the content of Si (mass %), [Al] is the content of Al (mass %), [Cr] is the content of Cr (mass %), [Cu] is the content of Cu (mass %), [Mo] is the content of Mo (mass %), [Ni] is the content of Ni (mass %), and [Nb] is the content of Nb (mass %).

When the finish rolling completing temperature is lower than the Ar3 transformation point temperature+50° C., the low-temperature transformation products in the microstructure of the dual phase steel sheet are brought into a dispersion state where they are continuously arranged in an aligned manner. Furthermore, the average value of the distance of closest approach between the low-temperature transformation products becomes less than 10 μm, voids are likely to be connected, ductile fracture is likely to be caused, and the burring workability deteriorates.

On the other hand, when it is higher than 1000° C., even when a cooling pattern after rolling is controlled in any way, ferrite transformation becomes insufficient and the area fraction of the low-temperature transformation product in the microstructure of a product sheet becomes greater than 10%, and the burring workability deteriorates after all.

Further, the finish rolling is rolling with plural passes by a tandem mill, and the total reduction ratio is not less than 75% nor more than 95%.

As long as the finish rolling is performed in a tandem mill enabling rolling with plural passes, reduction is performed through plural passes in the rolling, and thereby non-recrystallization by rolling and recrystallization for an inter-pass time period until the coming pass are repeated plural times. As a result, austenite grains are refined and the average grain diameter of the low-temperature transformation product in the microstructure of the dual phase steel sheet can be made 15 μm or less. However, when the total reduction ratio is less than 75%, austenite grains cannot be refined sufficiently and the average grain diameter of the low-temperature transformation product in the microstructure of the dual phase steel sheet cannot be made 15 μm or less.

On the other hand, when it is greater than 95%, the effect is saturated, and further an excessive load is applied to the rolling mill, so that it is not preferable operationally.

Further, a reduction ratio in each pass is desirably 10% or more. When the reduction ratio in each pass is less than 10% for three passes at the rear stand of a finishing mill in particular and an average rolling ratio for three passes is less than 10%, grain growth progresses significantly during the three passes and after completion of the finish rolling, and there is a risk that the average grain diameter of the low-temperature transformation product in the microstructure of the dual phase steel sheet is no longer able to be made 12 μm or less.

Incidentally, in the present invention, a rolling speed is not limited in particular. However, when the rolling speed at a finish final stand is less than 400 mpm, the time period for each finish rolling pass is prolonged. As a result, austenite grains grow to be coarse, and there is a risk that the average grain diameter of the low-temperature transformation product in the microstructure of a product sheet is no longer able to be made 15 μm or less stably. Therefore, the rolling speed is desirably 400 mpm or more. Further, when it is 650 mpm, the average grain diameter of the low-temperature transformation product can be made 12 μm or less stably, so that 650 mpm is further desirable. Further, even if the upper limit is not limited in particular, the effect of the present invention is achieved, but it is realistically 1800 mpm or less due to facility restriction.

After completion of the finish rolling, in order to elaborate the microstructure of a product, cooling optimized by control of a run-out-table is performed.

First, the time period until start of the cooling after completion of the finish rolling is within three seconds. When this time period until start of the cooling is longer than three seconds, in austenite before being transformed, precipitation of coarse and unaligned carbonitride of Ti progresses, the precipitation amount of fine and aligned carbide of Ti to precipitate in ferrite during cooling to be performed later decreases, and the strength might be decreased. Further, austenite grains grow to be coarse, and there is a risk that the average grain diameter of the low-temperature transformation product in the microstructure of the product sheet is no longer able to be made 15 µm or less.

The lower limit value of the time period until start of this cooling does not have to be limited in particular in the present invention, but when it is shorter than 0.4 seconds, cooling is performed in a state where a lamellar worked structure obtained by rolling remains, even in a product sheet, low-temperature transformation products continuously arranged in an aligned manner are obtained, and the burring workability might deteriorate.

As for the rate of a first-stage cooling step to be first performed after completion of the rolling, an average cooling rate of 15° C./sec or more is required. When this cooling rate is less than 15° C./sec, pearlite is formed during cooling, and an intended microstructure might not be obtained. Incidentally, even if the upper limit of the cooling rate in the first-stage cooling step is not limited in particular, the effect of the present invention can be obtained. However, when the cooling rate is greater than 150° C./sec, controlling a cooling completing temperature is extremely difficult to make it difficult to elaborate the microstructure, so that it is desirably set to 150° C./sec or less.

A cooling stop temperature in the first-stage cooling step is lower than the Ar3 transformation point temperature. When the cooling stop temperature is the Ar3 transformation point temperature or higher, it is not possible to perform precipitation control of TiC to finely precipitate in ferrite at the time of austenite/ferrite transformation during cooling in the subsequent second-stage cooling step and to contribute to strength. On the other hand, the lower limit of the cooling stop temperature of the first-stage cooling step is not limited in particular. However, a cooling stop temperature of the subsequent second-stage cooling step to be performed for exhibiting precipitation strengthening of ferrite is higher than 600° C. as a condition of exhibiting precipitation strengthening of ferrite. Thus, if the cooling stop temperature of the first-stage cooling step is 600° C. or lower, precipitation strengthening cannot be obtained. Further, when it becomes an Ar1 point or lower, ferrite cannot be obtained, to thus make it impossible to obtain an intended microstructure.

In the second-stage cooling step to be performed next, an average cooling rate is 10° C./sec or less, and in the present invention, air cooling (standing-to-cool) is kept in mind. During cooling in this temperature zone, transformation to ferrite from austenite is promoted, and simultaneously with the transformation, fine carbide of Ti precipitates in ferrite, and an intended strength of the steel sheet is obtained. When this cooling rate is greater than 10° C./sec, a moving speed of an interface between these two phases in the transformation to ferrite from austenite becomes too fast, so that the precipitation of carbide of Ti at the interface between the phases cannot keep up with it and sufficient precipitation strengthening cannot be obtained.

Further, when it is greater than 10° C./sec, the transformation to ferrite from austenite is delayed and an intended microstructure cannot be obtained. On the other hand, the lower limit of the cooling rate in the second-stage cooling step does not have to be limited in particular in the present invention. However, unless heat input is performed externally by a heating device, or the like, the cooling rate in the air cooling is 3° C./sec or so even though the sheet thickness is half an inch or so, which is an upper limit sheet thickness assumed in the present invention.

Further, a cooling time period in the second-stage cooling step is 1 second or longer and shorter than 100 seconds. This step is an extremely important step not only for promoting two-phase separation of ferrite and austenite to obtain an intended second phase fraction but also for promoting precipitation strengthening by fine carbide of Ti in ferrite obtained after the transformation being completed. When this time period is shorter than 1 second, the ferrite transformation does not progress and an intended microstructure cannot be obtained, and furthermore the precipitation of carbide of Ti in ferrite obtained after the transformation does not progress, so that intended strength and burring workability of the steel sheet cannot be obtained. When it is shorter than 3 seconds, the ferrite transformation and the precipitation of carbide do not progress sufficiently, so that it is desirably 3 seconds or longer because there is a risk that low-temperature transformation products and strength of ferrite are no longer able to be obtained sufficiently.

On the other hand, even when it is 100 seconds or longer, the above-described effect is saturated and further productivity decreases significantly. When it is 15 seconds or longer, the average crystal diameter of the low-temperature transformation product of the dual phase steel sheet becomes coarse, and further there is a concern that pearlite is mixed into the microstructure, so that it is desirably shorter than 15 seconds.

The cooling stop temperature in the second-stage cooling step is higher than 600° C. When this temperature is 600° C. or lower, the precipitation of carbide of Ti in ferrite obtained after transformation does not progress, so that the strength decreases.

On the other hand, the upper limit of the cooling stop temperature in the second-stage cooling step is not defined in particular, but when it is higher than 700° C., two-phase separation of ferrite and austenite is not sufficient and an intended fraction of the low-temperature transformation product cannot be obtained, and furthermore the precipitation of carbide of Ti in ferrite is over-aged and the strength decreases.

In a third-stage cooling step to be subsequently performed, cooling is performed at a cooling rate of 15° C./sec or more. When this cooling rate is less than 15° C./sec, pearlite is mixed into the microstructure, and thereby an intended microstructure might not be obtained. Incidentally, a completing temperature of the third-stage cooling step is a coiling temperature. Even though the upper limit of the cooling rate in the third-stage cooling step is not limited in particular, the effect of the present invention can be obtained, but when a sheet ward caused by thermal strain is considered, it is desirably set to 300° C./sec or less.

In the third-stage cooling step, the steel sheet is cooled down to a temperature zone of 350° C. or lower to be coiled. When this temperature is higher than 350° C., intended low-temperature transformation products cannot be obtained. Concretely, coarse carbide is formed between laths of bainite constituting the low-temperature transformation product to be a starting point of occurrence of a crack at the time of burring, and the burring workability deteriorates.

On the other hand, the lower limit value of the coiling temperature does not have to be limited in particular, but when a coil is in a state of being exposed to water for a long time, appearance failure caused by rust is concerned, so that it is desirably 50° C. or higher. Further, when this temperature is 100° C. or lower, most of the low-temperature transformation product turns into fresh martensite and uniform elongation improves to be advantageous to forming with a dominant n value such as bulging.

In order to more efficiently exhibit precipitation strengthening by carbide of Ti in the cooling step after finish rolling, it is necessary to control a cooling pattern up to coiling itself. Concretely, a total cumulative diffusion length $L_{total}$ of Ti in ferrite expressed by Expression (2) below is controlled in the range of not less than 0.15 nor more than 0.5.

That is, when the total cumulative diffusion length $L_{total}$ of Ti in ferrite is expressed by Expression (3) below by adding up a diffusion length L of Ti in ferrite expressed by Expression (2) below for a very short time period Δt/sec from a cooling completing temperature to coiling, $0.15 \leq L_{total} \leq 0.5$ is satisfied.

$$L = \sqrt{D(T+273)t} \qquad \text{Expression (2)}$$

$$L_{total} = \Sigma \sqrt{D(T+273)\Delta t} \qquad \text{Expression (3)}$$

Here, D(T+273) is a volume diffusion coefficient at T° C. and t is a diffusion time period, and D(T) is expressed by Expression (4) below using a diffusion coefficient D0 of Ti, an activation energy Q, and a gas constant R.

$$D(T) = D0 \times \text{Exp}(-Q/R(T+273)) \qquad \text{Expression (4)}$$

When this $L_{total}$ value is less than 0.15 μm, the precipitation of carbide of Ti does not progress during cooling to result in underaging, resulting in that precipitation strengthening ability cannot be obtained efficiently. On the other hand, when it is greater than 0.5 μm, the precipitation of carbide of Ti progresses too much during cooling to result in overaging, resulting in that precipitation strengthening ability cannot be obtained efficiently after all.

Incidentally, for the purpose of achieving improvement in ductility by shape correction of the steel sheet and introduction of mobile dislocation, skinpass rolling at a reduction ratio of not less than 0.1% nor more than 2% is desirably performed after all the steps are completed. Further, for the purpose of removing scales attached to the surface of an obtained hot-rolled steel sheet, pickling may also be performed on the obtained hot-rolled steel sheet according to need after all the steps are completed. Further, after the pickling, on the obtained hot-rolled steel sheet, skinpass at a reduction ratio of 10% or less may also be performed inline or offline, or cold rolling at a reduction ratio of down to 40% or so may also be performed.

Further, before or after, or before and after the skinpass rolling, scales on the surface are removed. The step of removing scales is not defined in particular. For example, general pickling using hydrochloric acid or sulfuric acid, or a device according to a line such as surface grinding by a sander or the like or surface scarfing using plasma, a gas burner, or the like can be applied.

Further, after casting, after hot rolling, or after cooling, a hot treatment may be performed on a hot-rolled steel sheet with the present invention applied thereto on a hot-dip plating line, and further on the hot-rolled steel sheet, a surface treatment may also be performed additionally. Plating is performed on the hot-dip plating line, and thereby corrosion resistance of the hot-rolled steel sheet improves.

Incidentally, when galvanizing is performed on the hot-rolled steel sheet obtained after pickling, the obtained steel sheet may also be immersed in a galvanizing bath to be subjected to an alloying treatment according to need. By performing the alloying treatment, the hot-rolled steel sheet improves in welding resistance against various weldings such as spot welding in addition to the improvement in corrosion resistance.

EXAMPLE

Steels A to Z and a to d having chemical components shown in Table 1 were melted in a converter refining and secondary refining step, steel billets (slabs) manufactured by continuous casting were each reheated and reduced to a sheet thickness of 2.3 to 3.4 mm by finish rolling subsequently to rough rolling, and were each cooled on a run-out-table to then be coiled, and hot-rolled steel sheets were prepared. More specifically, in accordance with manufacturing conditions shown in Tables 2 and 3, hot-rolled steel sheets were prepared. Incidentally, chemical compositions in Table 1 all mean mass %.

In Table 1, Ti* represents [Ti]−48/14[N]−48/32[S], in Tables 1 and 2, Ex.C represents [C]−12/48×([Ti]+48/93[Nb]−48/14[N]−48/32[S]), and in Table 1, Mn/S represents [Mn]/[S]. Further, the balance of the component in Table 1 is Fe and impurities, each underline in Tables 1 and 2 indicates that a numerical value is outside the range of the present invention. Steels K and R each do not contain Si intentionally. In Table 1, "−" indicates that no intentional containing is performed.

In Table 2, "STEEL" indicates a steel having the components corresponding to each symbol shown in Table 1. "SOLUTION TEMPERATURE" indicates the minimum slab reheating temperature (=$SRT_{min}$) calculated by Expression (1). "Ar3 TRANSFORMATION POINT TEMPERATURE" indicates a temperature calculated by Expression (5), (6), or (7). "Ex.C" indicates a value calculated by [C]−12/48×([Ti]+48/93[Nb]−48/14[N]−48/32[S]).

In the manufacturing conditions in Tables 2 and 3, in the heating step, "HEATING TEMPERATURE" indicates a maximum ultimate temperature in slab reheating and "HOLDING TIME PERIOD" indicates a holding time period at a predetermined heating temperature. In rough rolling, "TOTAL PASS NUMBER" indicates a total value of the number of rolling passes in rough rolling, "TOTAL REDUCTION RATIO" indicates a reduction ratio in rough rolling from start to completion of rough rolling, "NUMBER OF PASSES AT 1050 TO 1150° C. AND AT 20% OR MORE" indicates the number of passes of which rolling at a rolling ratio of 20% or more was performed in a temperature zone of 1050 to 1150° C., "TIME PERIOD UNTIL START OF FINISH ROLLING" indicates a time period until start of finish rolling after completion of rough rolling, and "AVERAGE AUSTENITE GRAIN DIAMETER IMMEDIATELY BEFORE FINISH ROLLING" indicates an average grain diameter of austenite grains immediately before a rough bar is bitten at the first stand of finish rolling. Recognition of this austenite grain diameter can be obtained in a manner that a crop piece obtained by cutting a rough bar before being subjected to finish rolling by a crop shear or the like is quenched as much as possible to be cooled down to room temperature or so, and a cross section parallel to a rolling direction is etched to make austenite grain boundaries appear to measure austenite grain diameters by an optical microscope. On this occasion, 20 visual fields or more at the ¼ position of a sheet thickness are measured at 50 or more magnifications by an image analysis, a point counting method, or the like.

In finish rolling, "ROLLING START TEMPERATURE" indicates a temperature immediately before a rough bar is bitten at the first stand of finish rolling, "TOTAL REDUCTION RATIO" indicates a reduction ratio during finish rolling from start to completion of finish rolling, "AVERAGE REDUCTION RATIO FOR 3 PASSES AT REAR STAND" indicates an average value of reduction ratios from the final pass including the final pass to the third pass in finish rolling in which continuous rolling with plural passes is normally performed, "FINISH ROLLING OUTLET SIDE SPEED" indicates an outlet side sheet passing speed at the rolling stand after a finish rolling final reduction pass is completed, and "FINISHING TEMPERATURE" indicates a temperature immediately after a rolling stand outlet side of a finish rolling final pass. Incidentally, the reduction ratio may be an actual performance value calculated from a sheet thickness, or may also be a setup value of a rolling stand. Further, the temperature is desirably measured at the step position with a radiation thermometer or a contact thermometer, but may also be an estimated value obtained by a temperature model or the like.

The cooling step performed on a run-out-table is divided into first to third-stage cooling steps in terms of precipitation control and structure control. First, in "FIRST-STAGE COOLING STEP," "TIME PERIOD UNTIL START OF COOLING" indicates a time period until start of cooling on a run-out-table after passing through a rolling stand of a finish rolling final pass, "COOLING RATE" indicates an average cooling rate by water cooling, and "COOLING STOP TEMPERATURE" indicates a temperature at which water cooling in the first-stage cooling step is stopped. In "SECOND-STAGE COOLING STEP," "COOLING RATE" indicates an average cooling rate by air cooling without pouring water mainly, "HOLDING TIME PERIOD" indicates a holding time period of air cooling without pouring water, and "COOLING STOP TEMPERATURE" indicates a temperature at which holding of air cooling without pouring water is completed. In "THIRD-STAGE COOLING STEP," "COOLING RATE" indicates an average cooling rate until restart of water cooling and coiling after air cooling and holding, and "COILING TEMPERATURE" indicates a temperature immediately before a steel sheet is coiled into a coil shape by a coiler after stopping water cooling. Incidentally, "TOTAL CUMULATIVE DIFFUSION LENGTH" indicates the total cumulative diffusion length $L_{total}$ of Ti in ferrite and is obtained by Expression (3) by adding up the diffusion length L of Ti in ferrite expressed by Expression (2) for the very short time period Δt/sec from a cooling completing temperature to coiling.

Microstructures of steel sheets obtained by manufacturing methods described in Tables 2 and 3 are shown in Table 4, and mechanical property, surface property, and corrosion resistance are shown in Table 5.

First, a sample was taken from the ¼W position or ¾W position of a sheet width of each of the obtained steel sheets, and by using an optical microscope, each microstructure at the ¼ thickness of a sheet thickness was observed. As adjustment of the samples, a sheet thickness cross section in the rolling direction was polished as an observation surface to be subjected to etching with a nital reagent and a LePera reagent. From each optical micrograph at 500 magnifications of the sheet thickness cross sections etched with a nital reagent and a LePera reagent, "MICROSTRUCTURE" was classified.

Further, from each of optical micrographs at 500 magnifications of the sheet thickness cross sections etched with a LePera reagent, "SECOND PHASE CHARACTERISTIC" being a distribution state of the low-temperature transformation product being a second phase was recognized by an image analysis. Here, the dispersion state of the low-temperature transformation product is classified into one in which the low-temperature transformation products are dispersed in an island shape at a corner, an edge, and a grain boundary surface of a ferrite grain as "ISLAND SHAPE," one in which they are island shaped but are distributed continuously parallel to the rolling direction as "ALIGNED STATE," and one in which they are dispersed to surround a grain boundary surface of a ferrite grain mainly as "FILM SHAPE."

Further, by the image analysis, "SECOND PHASE FRACTION" being the area fraction of the low-temperature transformation product being a second phase and "SECOND PHASE AVERAGE GRAIN DIAMETER" being the average grain diameter of the low-temperature transformation product were obtained. "Ex.C (%)/fsd (%)" is a value of "Ex.C (%)" in Table 2 divided by "SECOND PHASE FRACTION." Incidentally, the average crystal diameter of the low-temperature transformation product is one in which circle-equivalent diameters are number-averaged. Further, plural low-temperature transformation products were selected arbitrarily, respective distances of closest approach of them were obtained, and an average value of 20 points was set to "AVERAGE VALUE OF DISTANCE OF CLOSEST APPROACH BETWEEN SECOND PHASES."

Nanohardness Hn was measured by using TriboScope/TriboIndenter manufactured by Hysitron. As the measuring condition, hardness of the low-temperature transformation product was measured at 20 points or more with 1 mN of load, and an arithmetic average of them and a standard deviation were calculated.

Measurement of "FERRITE TiC DENSITY" being a TiC precipitate density was performed by a three-dimensional atom probe measurement method. First, an acicular sample is prepared from a sample to be measured by cutting and electropolishing, and by using focused ion beam milling together with electropolishing according to need. In the three-dimensional atom probe measurement, integrated data can be reconstructed to obtain an actual distribution image of atoms in a real space. A number density of TiC precipitates is obtained from the volume of a three-dimensional distribution image of TiC precipitates and the number of TiC precipitates. Incidentally, the measurement was performed in a manner that ferrite grains are specified and five or more of ferrite grains for each sample are used. Further, as for the size of the above-described TiC precipitates, a diameter calculated from the number of atoms constituting observed TiC precipitates and a lattice constant of TiC assuming that the precipitates are spherical is set as the size. Arbitrarily, diameters of 30 or more of TiC precipitates were measured. An average value of them was 2 to 30 nm or so.

Of the mechanical property, tensile strength properties (YP, TS, and El) were evaluated based on JIS Z 2241-1998 by using a No. 5 test piece of JIS Z 2201-1998 taken from the ¼W position or the ¾W position of the sheet width in a direction vertical to the rolling direction. As an index of the burring workability, a hole expanding test was employed. With regard to the hole expanding test, a test piece was taken from the same position as that where a tensile test piece was taken, and the burring workability was evaluated based on a test method described in Japan Iron and Steel Federation specification JFS T 1001-1996.

Next, in order to examine the notch fatigue strength, a fatigue test piece having a shape shown in FIG. 1 was taken from the same position as that where the tensile test piece was taken so that the side in the rolling direction could be a long side and was subjected to a fatigue test. Here, the fatigue test piece described in FIG. 1 is a notched test piece prepared for obtaining the notch fatigue strength. Side surface corner portions (portions each surrounded by a dotted line in FIG. 1) of this notched test piece are each chamfered with 1R to be polished in the longitudinal direction with #600.

In order to approach the fatigue property evaluation in actual use of an automobile part, the notch was made by punching with a cylinder punch in the same manner as that of the hole expanding test piece. Incidentally, a punching clearance was set to 12.5%. However, on the fatigue test piece, grinding of fine finishing was performed down to the depth of 0.05 mm or so from the uppermost surface layer. A Schenck type fatigue testing machine was used for the fatigue test, and a test method was based on JIS Z 2273-1978 and JIS Z 2275-1978. "σwk/TS" being the definition of the notch fatigue property in Table 3 is a value of a 2 million cycle fatigue strength obtained by this test divided by a tensile strength.

The surface property was evaluated by "SURFACE DEFECT" and "ROUGHNESS" before pickling. When this evaluation is equal to or less than the reference, there is sometimes a case that the surface quality is evaluated according to a pattern and unevenness of the surface caused by a scale defect by inferiors and customers even after pickling. Here, "SURFACE DEFECT" indicates a result obtained by visually recognizing the presence/absence of scale defects such as Si scales, scales, and spindles, and the case of scale defects being present is shown as "×" and the case of no scale defects is shown as "○." Incidentally, one in which these defects are partial or the reference or less is regarded as "SLIGHT" to be shown as "Δ." "ROUGHNESS" is evaluated by Rz and indicates a value obtained by a measurement method described in JIS B 0601-2001. Incidentally, as long as Rz is 20 μm or less, the surface quality is a level with no problems.

The corrosion resistance was evaluated by "CONVERSION TREATMENT PROPERTY" AND "POST-COATING CORROSION RESISTANCE." First, the manufactured steel sheet was pickled, and then was subjected to a conversion treatment in which a zinc phosphate coating film of 2.5 g/m² is attached. At this stage, measurements of presence/absence of lack of hiding and a P ratio were performed as "CONVERSION TREATMENT PROPERTY."

The phosphoric acid conversion treatment is a treatment using a chemical solution having phosphoric acid and Zn ions as its main component, and is a chemical reaction to generate a crystal called phosphophyllite: FeZn2(PO4)3·4H2O between Fe ions to liquate from the steel sheet. The technical points of the phosphoric acid conversion treatment are to (1) make Fe ions liquate to promote the reaction and to (2) densely form phosphophyllite crystals on the surface of the steel sheet. Particularly, with regard to (1), when oxides ascribable to formation of Si scales remain on the surface of the steel sheet, liquation of Fe is prevented and a portion to which a conversion coating film does not attach, which is called lack of hiding, appears, due to no liquation of Fe, an abnormal conversion treatment coating film that is not formed normally on the surface of an iron, called hopeite: Zn3(PO4)3·4H2O, is formed, and thereby performance after coating sometimes deteriorates. Thus, it becomes important to make the surface normal so that by liquating Fe on the surface of the steel sheet by phosphoric acid, Fe ions can be supplied sufficiently.

This lack of hiding can be recognized by observation by a scanning electron microscope, 20 visual fields or so are observed at 1000 magnifications, and the case where the conversion coating film is uniformly attached to the entire surface and no lack of hiding can be recognized is regarded as no lack of hiding to be shown as "○." Further, the case where the visual field with recognition of lack of hiding is 5% or less is regarded as slight to be shown as "Δ." Further, the case where it is greater than 5% is regarded as presence of lack of hiding to be evaluated as "×."

On the other hand, the P ratio can be measured by using an X-ray diffraction device, a ratio of an X-ray diffraction intensity P of the phosphophyllite (100) plane and an X-ray diffraction intensity H of the hopeite (020) plane is taken, and the P ratio is evaluated by P ratio=P/(P+H). That is, the P ratio represents the ratio of hopeite and phosphophyllite in the coating film obtained by performing the conversion treatment, and it means that as the P ratio is higher, phosphophyllite is more contained and phosphophyllite crystals are densely formed on the surface of the steel sheet. Generally, P ratio ≥0.80 is required in order to satisfy anticorrosion performance and coating performance, and under severe corrosive environment such as in a thawing salt scattering region, P ratio ≥0.85 is required.

Next, with regard to the corrosion resistance, electrodeposition coating to have a thickness of 25 μm was performed after the conversion treatment and a coating and baking treatment at 170° C.× for 20 minutes was performed, and then an incision having a length of 130 mm was made in an electrodeposition coating film to reach the base iron with a knife having a sharp end, and under a salt spray condition described in JIS Z 2371, 5% salt spraying at a temperature of 35° C. was performed for 700 hours continuously and then a tape (Nichiban Co., Ltd. 405A-24 JIS Z 1552) having a width of 24 mm and having a length of 130 mm was applied on the incision portion parallel to the incision portion, and the maximum coating film peeled width obtained after the tape was peeled off was measured. This maximum coating film peeled width of greater than 4 mm was defined that the corrosion resistance is inferior.

Next, results will be explained. Incidentally, with regard to Steel numbers 32, 36, and 46, the sheet was passed through an alloying hot-dip galvanizing line after the pickling, and at a Zn bath temperature of 430 to 460° C., plating bath immersion was performed, and on Steel 32 and 46 out of them, an alloying treatment was further performed at an alloying temperature of 500 to 600° C.

Steel numbers 1, 4, 9, 10, 11, 20, 23, 24, 25, 26, 27, 28, 29, 30, 31, 32, 33, 34, 35, 36, 37, 38, and 39 are in accordance with the present invention.

These steel sheets are steel sheets of grades being 540 MPa grade and higher that contain predetermined amounts of steel components and in which at the position of ¼ thickness of the sheet thickness, a microstructure is a dual phase with its main phase composed of polygonal ferrite precipitation-strengthened by carbide of Ti and its second phase composed of 1 to 10% in area fraction (fsd (%)) of low-temperature transformation products dispersed in an island shape, $0.001 \leq Ex.C$ (%)/fsd (%)$\leq 0.01$ (Ex.C (%)= [C]−12/48×{[Ti]+48/93×[Nb]−48/14×[N]−48/32×[S]}) is satisfied, an average crystal diameter of the low-temperature transformation product is 3 to 15 μm, and an average value of a distance of closest approach between the low-temperature transformation products is 10 to 20 μm, and high-strength steel sheets having a hole expansion value λ≥70%, having a notch fatigue property of σWK/TS≥0.35, and having slight surface defects or no surface defects can be obtained.

Steel numbers 32 and 39 contain Steel K and R containing no Si intentionally respectively, and the content of Si of them is 0 or an impurity level. However, Steel numbers 32 and 39 also satisfy the mechanical property of the present invention.

The steels other the above are outside the range of the present invention due to the following reasons.

That is, with regard to Steel number 2, the heating temperature is outside the range of the manufacturing method of the present invention steel, so that the predetermined microstructure cannot be obtained and the tensile strength is low.

With regard to Steel number 3, the total reduction ratio of the rough rolling is outside the range of the manufacturing method of the present invention steel, so that the predetermined microstructure cannot be obtained and the hole expansion value is low.

With regard to Steel number 5, the number of passes at 1050 to 1150° C. and at 20% or more is outside the range of the manufacturing method of the present invention steel, so that the predetermined microstructure cannot be obtained and the hole expansion value is low.

With regard to Steel number 6, the time period until start of the finish rolling is outside the range of the manufacturing method of the present invention steel, so that the predetermined microstructure cannot be obtained and the tensile strength and the hole expansion value are low.

With regard to Steel number 7, the finish rolling start temperature is outside the range of the manufacturing method of the present invention steel, so that the predetermined microstructure cannot be obtained and the tensile strength is low.

With regard to Steel number 8, the total reduction ratio of the finish rolling is outside the range of the manufacturing method of the present invention steel, so that the predetermined microstructure cannot be obtained and the hole expansion value is low.

With regard to Steel number 12, the finish rolling finishing temperature is outside the range of the manufacturing method of the present invention steel, so that the predetermined microstructure cannot be obtained and the hole expansion value is low.

With regard to Steel number 13, the finish rolling finishing temperature is outside the range of the manufacturing method of the present invention steel, so that the predetermined microstructure cannot be obtained and the hole expansion value is low.

With regard to Steel number 14, the time period until the cooling is outside the range of the manufacturing method of the present invention steel, so that the predetermined microstructure cannot be obtained and the tensile strength and the hole expansion value are low.

With regard to Steel number 15, the cooling rate of the cooling (a) is outside the range of the manufacturing method of the present invention steel, so that the predetermined microstructure cannot be obtained and the hole expansion value and the notch fatigue property are low.

With regard to Steel number 16, the cooling stop temperature of the cooling (a) is outside the range of the manufacturing method of the present invention steel, so that the predetermined microstructure cannot be obtained and the tensile strength and the notch fatigue property are low.

With regard to Steel number 17, the cooling stop temperature of the cooling (a) is outside the range of the manufacturing method of the present invention steel, so that the predetermined microstructure cannot be obtained and the tensile strength and the notch fatigue property are low.

With regard to Steel number 18, the cooling rate of the cooling (b) is outside the range of the manufacturing method of the present invention steel, so that the predetermined microstructure cannot be obtained and the tensile strength and the hole expansion value are low.

With regard to Steel number 19, the holding time period of the cooling (b) is outside the range of the manufacturing method of the present invention steel, so that the predetermined microstructure cannot be obtained and the tensile strength and the notch fatigue property are low.

With regard to Steel number 21, the cooling rate of the cooling (c) is outside the range of the manufacturing method of the present invention steel, so that the predetermined microstructure cannot be obtained and the hole expansion value and the notch fatigue property are low.

With regard to Steel number 22, the coiling temperature is outside the range of the manufacturing method of the present invention steel, so that the predetermined microstructure cannot be obtained and the hole expansion value is low.

With regard to Steel number 40, the content of C is outside the range of the present invention steel, so that the predetermined microstructure cannot be obtained and the hole expansion value is low.

With regard to Steel number 41, the content of C is outside the range of the present invention steel, so that the predetermined microstructure cannot be obtained and the tensile strength is low.

With regard to Steel number 42, the content of Si is outside the range of the present invention steel, so that the surface property is poor.

With regard to Steel number 43, the content of Mn is outside the range of the present invention steel, so that slab cracking occurs to make the rolling impossible.

With regard to Steel number 44, the content of Mn is outside the range of the present invention steel, so that the predetermined microstructure cannot be obtained and the tensile strength is low.

With regard to Steel number 45, the content of P is outside the range of the present invention steel, so that the elongation and the notch fatigue property are low due to embrittlement.

With regard to Steel number 46, the content of S is outside the range of the present invention steel, so that MnS becomes a starting point of a crack and the hole expansion value is low.

With regard to Steel number 47, the content of N is outside the range of the present invention steel, so that coarse TiN becomes a starting point of a crack and the hole expansion value is low.

With regard to Steel number 48, the content of Ti is outside the range of the present invention steel, so that the predetermined microstructure cannot be obtained and the notch fatigue property is low.

With regard to Steel number 49, the content of Ti is outside the range of the present invention steel, so that the predetermined microstructure cannot be obtained and the tensile strength is low.

With regard to Steel number 50, the value of Ti* is outside the range of the present invention steel, so that the predetermined microstructure cannot be obtained and the hole expansion value and the notch fatigue property are low.

With regard to Steel number 51, the content of Al is outside the range of the present invention steel, so that the predetermined microstructure cannot be obtained and the hole expansion value is low.

| STEEL | C | Si | Mn | P | S | Al | N | Ti | Nb | Cu | Ni | Mo | V | Cr | W | B | Mg | Ca | Rem | OTHERS | Ti* | Ex.C | Mn·S | NOTE |
|---|---|---|---|---|---|---|---|---|---|---|---|---|---|---|---|---|---|---|---|---|---|---|---|---|
| A | 0.051 | 0.04 | 1.48 | 0.001 | 0.002 | 0.490 | 0.0031 | 0.166 | 0.014 | — | — | — | — | — | — | — | — | — | 0.0007 | | 0.1024 | 0.0236 | 740 | PRESENT INVENTION |
| B | 0.042 | 0.02 | 1.36 | 0.001 | 0.003 | 0.290 | 0.0035 | 0.033 | 0.009 | — | — | — | — | — | — | — | 0.0016 | — | — | | 0.0565 | 0.0267 | 453 | PRESENT INVENTION |
| C | 0.037 | 0.48 | 0.34 | 0.001 | 0.003 | 0.600 | 0.0031 | 0.063 | — | — | — | — | — | — | — | — | — | 0.0008 | — | | 0.0479 | 0.0250 | 113 | PRESENT INVENTION |
| D | 0.012 | 0.02 | 1.54 | 0.001 | 0.002 | 0.525 | 0.0039 | 0.022 | — | 0.04 | — | — | — | — | — | — | — | — | — | | 0.0060 | 0.0105 | 906 | PRESENT INVENTION |
| E | 0.039 | 0.02 | 1.51 | 0.001 | 0.001 | 0.523 | 0.0036 | 0.122 | — | — | 0.05 | — | — | — | — | — | — | — | — | | 0.1081 | 0.0620 | 1514 | PRESENT INVENTION |
| F | 0.052 | 0.45 | 1.55 | 0.001 | 0.002 | 0.577 | 0.0038 | 0.121 | — | — | — | 0.20 | — | — | — | — | — | — | — | | 0.1051 | 0.0260 | 775 | PRESENT INVENTION |
| G | 0.057 | 0.09 | 1.54 | 0.001 | 0.002 | 0.506 | 0.0039 | 0.123 | — | — | — | — | 0.08 | — | — | — | — | — | — | | 0.1071 | 0.0299 | 963 | PRESENT INVENTION |
| H | 0.052 | 0.02 | 0.24 | 0.001 | 0.001 | 0.574 | 0.0044 | 0.119 | — | — | — | — | — | 0.11 | — | 0.0014 | — | — | — | | 0.1015 | 0.0268 | 200 | PRESENT INVENTION |
| I | 0.055 | 0.02 | 2.10 | 0.001 | 0.002 | 0.534 | 0.0037 | 0.121 | — | — | — | — | — | — | 0.02 | — | — | — | — | | 0.1062 | 0.0286 | 1313 | PRESENT INVENTION |
| J | 0.051 | 0.01 | 2.44 | 0.001 | 0.001 | 0.522 | 0.0040 | 0.116 | — | — | — | — | — | — | — | — | — | — | — | | 0.1003 | 0.0254 | 2218 | PRESENT INVENTION |
| K | 0.057 | — | 2.88 | 0.001 | 0.001 | 0.568 | 0.0038 | 0.122 | — | — | — | — | — | — | — | — | 0.006 | — | — | | 0.1070 | 0.0303 | 2400 | PRESENT INVENTION |
| L | 0.051 | 0.01 | 1.59 | 0.001 | 0.001 | 1.440 | 0.0038 | 0.119 | — | — | — | — | — | — | — | — | — | 0.008 | — | | 0.1041 | 0.0254 | 1134 | PRESENT INVENTION |
| M | 0.057 | 0.02 | 1.56 | 0.001 | 0.002 | 0.950 | 0.0036 | 0.123 | — | — | — | — | — | — | — | — | — | — | 0.0007 | | 0.1073 | 0.0299 | 823 | PRESENT INVENTION |
| N | 0.051 | 0.02 | 1.50 | 0.001 | 0.001 | 0.080 | 0.0042 | 0.123 | — | — | — | — | — | — | — | — | — | — | — | Zr: 0.02% | 0.1068 | 0.0242 | 1157 | PRESENT INVENTION |
| O | 0.054 | 0.02 | 1.59 | 0.001 | 0.001 | 0.508 | 0.0075 | 0.119 | — | — | — | — | — | — | — | — | — | — | — | Sn: 0.01% | 0.0915 | 0.0311 | 1324 | PRESENT INVENTION |
| P | 0.052 | 0.02 | 1.51 | 0.001 | 0.002 | 0.520 | 0.0054 | 0.115 | — | — | — | — | — | — | — | — | — | — | — | Co: 0.002% | 0.0944 | 0.0285 | 1003 | PRESENT INVENTION |
| Q | 0.055 | 0.11 | 1.54 | 0.001 | 0.002 | 0.515 | 0.0037 | 0.184 | — | — | — | — | — | — | — | — | — | — | — | Zn: 0.004% | 0.1682 | 0.0129 | 770 | PRESENT INVENTION |
| R | 0.054 | — | 1.53 | 0.001 | 0.001 | 0.589 | 0.0037 | 0.050 | — | — | — | — | — | — | — | — | — | — | — | | 0.0354 | 0.0451 | 1272 | PRESENT INVENTION |
| S | 0.120 | 0.01 | 1.60 | 0.001 | 0.001 | 0.560 | 0.0040 | 0.122 | — | — | — | — | — | — | — | — | — | — | — | | 0.1061 | 0.0935 | 1454 | COMPARATIVE STEEL |
| T | 0.004 | 0.02 | 1.58 | 0.001 | 0.001 | 0.507 | 0.0035 | 0.124 | — | — | — | — | — | — | — | — | — | — | — | | 0.1100 | −0.0235 | 1315 | COMPARATIVE STEEL |
| U | 0.057 | 0.75 | 1.51 | 0.001 | 0.002 | 0.573 | 0.0043 | 0.116 | — | — | — | — | — | — | — | — | — | — | — | | 0.0990 | 0.0319 | 1005 | COMPARATIVE STEEL |
| V | 0.054 | 0.01 | 3.20 | 0.001 | 0.001 | 0.593 | 0.0043 | 0.122 | — | — | — | — | — | — | — | — | — | — | — | | 0.1048 | 0.0237 | 2286 | COMPARATIVE STEEL |
| W | 0.051 | 0.02 | 0.11 | 0.001 | 0.002 | 0.577 | 0.0039 | 0.116 | — | — | — | — | — | — | — | — | — | — | — | | 0.0993 | 0.0259 | 58 | COMPARATIVE STEEL |
| X | 0.059 | 0.02 | 1.55 | 0.080 | 0.001 | 0.567 | 0.0043 | 0.119 | — | — | — | — | — | — | — | — | — | — | — | | | | | |
| Y | 0.055 | 0.01 | 1.51 | 0.001 | 0.010 | 0.522 | 0.0044 | 0.116 | — | — | — | — | — | — | — | — | — | — | — | | | | | |
| Z | 0.099 | 0.01 | 1.55 | 0.001 | 0.002 | 0.520 | 0.0200 | 0.122 | — | — | — | — | — | — | — | — | — | — | — | | | | | |
| a | 0.055 | 0.01 | 1.60 | 0.001 | 0.002 | 0.547 | 0.0039 | 0.220 | — | — | — | — | — | — | — | — | — | — | — | | | | | |
| b | 0.055 | 0.02 | 1.54 | 0.001 | 0.002 | 0.523 | 0.0039 | 0.002 | — | — | — | — | — | — | — | — | — | — | — | | | | | |
| c | 0.060 | 0.02 | 1.52 | 0.001 | 0.001 | 0.549 | 0.0088 | 0.020 | — | — | — | — | — | — | — | — | — | — | — | | | | | |
| d | 0.057 | 0.01 | 1.55 | 0.001 | 0.002 | 2.100 | 0.0035 | 0.115 | — | — | — | — | — | — | — | — | — | — | — | | | | | |

-continued

| | | | | | | | | | | |
|---|---|---|---|---|---|---|---|---|---|---|
| X | — | — | — | — | — | — | 0.1028 | 0.0333 | 1405 | COMPARATIVE STEEL |
| Y | — | — | — | — | — | — | 0.0859 | 0.0337 | 151 | COMPARATIVE STEEL |
| Z | — | — | — | — | — | — | 0.0502 | 0.0467 | 777 | COMPARATIVE STEEL |
| a | — | — | — | — | — | — | 0.2039 | 0.0041 | 842 | COMPARATIVE STEEL |
| b | — | — | — | — | — | — | −0.0142 | 0.0580 | 811 | COMPARATIVE STEEL |
| c | — | — | — | — | — | — | −0.0123 | 0.0626 | 1087 | COMPARATIVE STEEL |
| d | — | — | — | — | — | — | 0.1003 | 0.0316 | 861 | COMPARATIVE STEEL |

TABLE 2

| | | METALLURGICAL FACTOR | | | MANUFACTURING CONDITION | | | | | | |
|---|---|---|---|---|---|---|---|---|---|---|---|
| | | | Ar3 TRANSFORMATION | | HEATING | | | ROUGH ROLLING | | | |
| STEEL NUMBER | STEEL | SOLUTION TEMPERATURE (°C) | POINT TEMPERATURE (°C) | EX.C (%) | HEATING TEMPERATURE (°C) | HOLDING TIME PERIOD (MINUTE) | TOTAL PASS NUMBER | TOTAL REDUCTION RATIO (%) | NUMBER OF PASSES AT 1050°C TO 1150°C AND AT 20% OR MORE | TIME PERIOD UNTIL START OF FINISH ROLLING (SECOND) | AVERAGE AUSTENITE GRAIN DIAMETER IMMEDIATELY BEFORE FINISH ROLLING (μm) |
| 1 PRESENT INVENTION | A | 1192 | 806 | 0.0236 | 1230 | 90 | 7 | 87 | 3 | 60 | 85 |
| 2 COMPARATIVE STEEL | A | 1192 | 806 | 0.0236 | 1150 | 90 | 7 | 87 | 3 | 30 | 75 |
| 3 COMPARATIVE STEEL | A | 1192 | 806 | 0.0236 | 1230 | 90 | 5 | 54 | 3 | 60 | 125 |
| 4 PRESENT INVENTION | A | 1192 | 806 | 0.0236 | 1230 | 90 | 3 | 75 | 1 | 60 | 90 |
| 5 COMPARATIVE STEEL | A | 1192 | 806 | 0.0236 | 1230 | 90 | 7 | 87 | 0 | 60 | 100 |
| 6 COMPARATIVE STEEL | A | 1192 | 806 | 0.0236 | 1230 | 90 | 7 | 87 | 3 | 210 | 160 |
| 7 PRESENT INVENTION | A | 1192 | 806 | 0.0236 | 1230 | 90 | 7 | 87 | 3 | 60 | 85 |
| 8 PRESENT INVENTION | A | 1192 | 806 | 0.0236 | 1230 | 45 | 7 | 87 | 3 | 60 | 85 |
| 9 PRESENT INVENTION | A | 1192 | 806 | 0.0236 | 1230 | 90 | 7 | 87 | 5 | 45 | 75 |
| 10 PRESENT INVENTION | A | 1192 | 806 | 0.0236 | 1230 | 90 | 7 | 87 | 3 | 60 | 85 |
| 11 PRESENT INVENTION | A | 1192 | 806 | 0.0236 | 1230 | 90 | 7 | 87 | 3 | 60 | 85 |
| 12 COMPARATIVE STEEL | A | 1192 | 806 | 0.0236 | 1230 | 90 | 7 | 87 | 3 | 150 | 100 |
| 13 PRESENT INVENTION | A | 1192 | 806 | 0.0236 | 1230 | 90 | 7 | 87 | 3 | 60 | 85 |
| 14 PRESENT INVENTION | A | 1192 | 806 | 0.0236 | 1230 | 90 | 7 | 87 | 3 | 60 | 85 |
| 15 PRESENT INVENTION | A | 1192 | 806 | 0.0236 | 1230 | 90 | 7 | 87 | 3 | 60 | 85 |
| 16 PRESENT INVENTION | A | 1192 | 806 | 0.0236 | 1230 | 90 | 7 | 87 | 3 | 60 | 85 |
| 17 PRESENT INVENTION | A | 1192 | 806 | 0.0236 | 1230 | 90 | 7 | 87 | 3 | 60 | 85 |
| 18 PRESENT INVENTION | A | 1192 | 806 | 0.0236 | 1230 | 90 | 7 | 87 | 3 | 60 | 85 |
| 19 PRESENT INVENTION | A | 1192 | 806 | 0.0236 | 1230 | 90 | 7 | 87 | 3 | 60 | 85 |
| 20 PRESENT INVENTION | A | 1192 | 806 | 0.0236 | 1230 | 90 | 7 | 87 | 7 | 45 | 70 |
| 21 COMPARATIVE STEEL | A | 1192 | 806 | 0.0236 | 1230 | 90 | 7 | 87 | 3 | 60 | 85 |
| 22 COMPARATIVE STEEL | A | 1192 | 806 | 0.0236 | 1230 | 99 | 7 | 87 | 3 | 60 | 85 |
| 23 PRESENT INVENTION | B | 1137 | 812 | 0.0279 | 1200 | 120 | 5 | 81 | 2 | 120 | 95 |
| 24 PRESENT INVENTION | C | 1116 | 902 | 0.0250 | 1200 | 120 | 5 | 81 | 2 | 120 | 95 |
| 25 PRESENT INVENTION | D | 965 | 823 | 0.0105 | 1200 | 120 | 5 | 81 | 3 | 90 | 95 |
| 26 PRESENT INVENTION | E | 1247 | 802 | 0.0620 | 1250 | 30 | 9 | 86 | 7 | 90 | 90 |
| 27 PRESENT INVENTION | F | 1198 | 810 | 0.0260 | 1230 | 60 | 9 | 86 | 7 | 90 | 90 |
| 28 PRESENT INVENTION | G | 1206 | 813 | 0.0299 | 1230 | 60 | 9 | 86 | 7 | 90 | 90 |
| 29 PRESENT INVENTION | H | 1196 | 831 | 0.0268 | 1230 | 60 | 9 | 86 | 7 | 90 | 90 |
| 30 PRESENT INVENTION | I | 1203 | 768 | 0.0286 | 1230 | 60 | 9 | 86 | 7 | 90 | 90 |
| 31 PRESENT INVENTION | J | 1191 | 742 | 0.0254 | 1230 | 60 | 9 | 86 | 7 | 90 | 90 |
| 32 PRESENT INVENTION | K | 1206 | 707 | 0.0303 | 1230 | 60 | 9 | 86 | 7 | 90 | 90 |
| 33 PRESENT INVENTION | L | 1195 | 855 | 0.0254 | 1230 | 60 | 9 | 86 | 7 | 90 | 90 |
| 34 PRESENT INVENTION | M | 1206 | 831 | 0.0299 | 1230 | 60 | 9 | 86 | 7 | 90 | 90 |

TABLE 2-continued

| | | METALLURGICAL FACTOR | | | MANUFACTURING CONDITION | | | | | | |
|---|---|---|---|---|---|---|---|---|---|---|---|
| | | | | | HEATING | | | ROUGH ROLLING | | | |
| STEEL NUMBER | STEEL | SOLUTION TEMPERATURE (° C.) | Ar3 TRANSFORMATION POINT TEMPERATURE (° C.) | EX.C (%) | HEATING TEMPERATURE (° C.) | HOLDING TIME PERIOD (MINUTE) | TOTAL PASS NUMBER | TOTAL REDUCTION RATIO (%) | NUMBER OF PASSES AT 1050° C. TO 1150° C. AND AT 20% OR MORE | TIME PERIOD UNTIL START OF FINISH ROLLING (SECOND) | AVERAGE AUSTENITE GRAIN DIAMETER IMMEDIATELY BEFORE FINISH ROLLING (μm) |
| PRESENT INVENTION 35 | N | 1197 | 794 | 0.0242 | 1210 | 100 | 5 | 81 | 2 | 120 | 95 |
| PRESENT INVENTION 36 | O | 1199 | 808 | 0.0311 | 1210 | 100 | 5 | 81 | 2 | 120 | 95 |
| PRESENT INVENTION 37 | P | 1193 | 816 | 0.0285 | 1210 | 100 | 5 | 81 | 2 | 120 | 95 |
| PRESENT INVENTION 38 | Q | 1240 | 814 | 0.0129 | 1250 | 45 | 9 | 86 | 7 | 90 | 90 |
| PRESENT INVENTION 39 | R | 1127 | 817 | 0.0451 | 1180 | 150 | 5 | 81 | 2 | 120 | 95 |
| COMPARATIVE STEEL 40 | S | 1274 | 789 | 0.0935 | 1280 | 40 | 9 | 86 | 7 | 90 | 90 |
| COMPARATIVE STEEL 41 | T | 1005 | 824 | −0.0235 | 1150 | 180 | 3 | 77 | 1 | 150 | 100 |
| COMPARATIVE STEEL 42 | U | 1201 | 835 | 0.0319 | 1230 | 45 | 9 | 86 | 7 | 90 | 90 |
| COMPARATIVE STEEL 43 | V | 1201 | 683 | 0.0277 | | | | SLAB CRACKING | | | |
| COMPARATIVE STEEL 44 | W | 1191 | 931 | 0.0259 | 1220 | 70 | 5 | 81 | 2 | 120 | 90 |
| COMPARATIVE STEEL 45 | X | 1207 | 813 | 0.0333 | 1220 | 70 | 5 | 81 | 2 | 120 | 95 |
| COMPARATIVE STEEL 46 | Y | 1199 | 815 | 0.0337 | 1230 | 70 | 5 | 81 | 2 | 120 | 95 |
| COMPARATIVE STEEL 47 | Z | 1210 | 810 | 0.0467 | 1260 | 30 | 9 | 86 | 7 | 120 | 90 |
| COMPARATIVE STEEL 48 | a | 1257 | 809 | 0.0041 | 1150 | 180 | 5 | 81 | 2 | 90 | 95 |
| COMPARATIVE STEEL 49 | b | 913 | 812 | 0.0580 | 1150 | 180 | 5 | 81 | 2 | 120 | 95 |
| COMPARATIVE STEEL 50 | c | 1065 | 814 | 0.0626 | 1150 | 180 | 5 | 81 | 2 | 120 | 95 |
| COMPARATIVE STEEL 51 | d | 1201 | 890 | 0.0316 | 1220 | 70 | 5 | 81 | 2 | 120 | 95 |

TABLE 3

| | | FINISH ROLLING | | | | | MANUFACTURING CONDITION — COOLING | | | | | | | |
|---|---|---|---|---|---|---|---|---|---|---|---|---|---|---|
| | | | | AVERAGE ROLLING | | | FIRST-STAGE COOLING | | | SECOND-STAGE COOLING | | | THIRD-STAGE COOLING | | ENTIRE COOLING |
| STEEL NUMBER | ROLLING START TEMPERATURE (°C) | TOTAL REDUCTION RATIO (%) | PASSES | RATIO FOR 3 AT REAR STAND (%) | FINISH ROLLING OUTLET SIDE SPEED (mpm) | FINISHING TEMPERATURE (°C) | TIME PERIOD UNTIL START OF COOLING (SECOND) | COOLING RATE (°C/SECOND) | COOLING STOP TEMPERATURE (°C) | COOLING RATE (°C/SECOND) | HOLDING TIME PERIOD (SECOND) | COOLING STOP TEMPERATURE (°C) | COOLING RATE (°C/SECOND) | COILING TEMPERATURE (°C) | TOTAL CUMULATIVE DIFFUSION LENGTH (μm) |
| PRESENT INVENTION 1 | 1040 | 90 | 18 | 806 | 720 | 920 | 1.1 | 50 | 680 | 5 | 4 | 660 | 70 | 100 | 0.16 |
| COMPARATIVE STEEL 2 | 1000 | 90 | 18 | 806 | 780 | 900 | 1.0 | 50 | 680 | 5 | 4 | 660 | 70 | 100 | 0.19 |
| COMPARATIVE STEEL 3 | 1050 | 94 | 21 | 806 | 700 | 910 | 1.1 | 50 | 680 | 5 | 4 | 660 | 70 | 100 | 0.19 |
| PRESENT INVENTION 4 | 1020 | 90 | 18 | 806 | 720 | 920 | 1.1 | 50 | 680 | 5 | 4 | 660 | 70 | 100 | 0.19 |
| COMPARATIVE STEEL 5 | 1040 | 90 | 18 | 806 | 740 | 920 | 1.1 | 50 | 680 | 5 | 4 | 660 | 70 | 100 | 0.19 |
| COMPARATIVE STEEL 6 | 1010 | 90 | 18 | 806 | 900 | 910 | 1.1 | 40 | 680 | 5 | 4 | 660 | 70 | 100 | 0.20 |
| COMPARATIVE STEEL 7 | 985 | 90 | 12 | 806 | 720 | 900 | 0.9 | 40 | 680 | 5 | 4 | 660 | 60 | 100 | 0.20 |
| COMPARATIVE STEEL 8 | 1040 | 74 | 18 | 806 | 720 | 900 | 1.1 | 40 | 680 | 5 | 4 | 660 | 70 | 100 | 0.20 |
| PRESENT INVENTION 9 | 1060 | 90 | 18 | 806 | 650 | 940 | 1.2 | 40 | 675 | 5 | 4 | 655 | 60 | 300 | 0.19 |
| PRESENT INVENTION 10 | 1040 | 84 | 7.6 | 806 | 700 | 890 | 1.1 | 50 | 680 | 5 | 4 | 660 | 60 | 50 | 0.19 |
| PRESENT INVENTION 11 | 1040 | 90 | 18 | 806 | 360 | 860 | 2.2 | 55 | 670 | 5 | 5 | 645 | 75 | 50 | 0.17 |
| PRESENT INVENTION 12 | 1020 | 90 | 18 | 806 | 400 | 760 | 2.0 | 55 | 670 | 5 | 3 | 645 | 75 | 50 | — |
| PRESENT INVENTION 13 | 1040 | 90 | 18 | 806 | 850 | 1020 | 0.9 | 35 | 680 | 5 | 5 | 665 | 55 | 50 | 0.20 |
| PRESENT INVENTION 14 | 1040 | 90 | 18 | 806 | 400 | 870 | 3.6 | 55 | 670 | 5 | 5 | 645 | 75 | 50 | 0.17 |
| PRESENT INVENTION 15 | 1040 | 90 | 18 | 806 | 720 | 920 | 1.1 | 5 | 710 | 5 | 4 | 690 | 60 | 50 | 0.50 |
| PRESENT INVENTION 16 | 1040 | 90 | 18 | 806 | 720 | 920 | 1.1 | 30 | 800 | 5 | 4 | 780 | 60 | 50 | 0.58 |
| PRESENT INVENTION 17 | 1040 | 90 | 18 | 806 | 720 | 920 | 1.1 | 65 | 520 | 5 | 4 | 500 | 60 | 50 | 0.06 |
| PRESENT INVENTION 18 | 1040 | 90 | 18 | 806 | 720 | 920 | 1.1 | 50 | 670 | 15 | 2 | 640 | 60 | 50 | 0.15 |
| PRESENT INVENTION 19 | 1040 | 90 | 18 | 806 | 750 | 930 | 1.1 | 50 | 670 | 5 | 0 | 670 | 60 | 50 | 0.12 |
| PRESENT INVENTION 20 | 1000 | 90 | 18 | 806 | 720 | 920 | 1.1 | 50 | 670 | 5 | 4 | 650 | 55 | 200 | 0.17 |
| PRESENT INVENTION 21 | 1040 | 90 | 18 | 806 | 720 | 920 | 1.1 | 50 | 670 | 5 | 4 | 650 | 5 | 50 | 0.19 |
| PRESENT INVENTION 22 | 1040 | 90 | 18 | 806 | 720 | 920 | 1.1 | 40 | 685 | 6 | 4 | 660 | 60 | 450 | 0.18 |
| PRESENT INVENTION 23 | 1020 | 91 | 20 | 812 | 720 | 900 | 1.1 | 70 | 700 | 6 | 4 | 675 | 65 | 150 | 0.21 |
| PRESENT INVENTION 24 | 1080 | 91 | 20 | 902 | 720 | 960 | 1.1 | 70 | 690 | 5 | 4 | 690 | 70 | 150 | 0.40 |
| PRESENT INVENTION 25 | 1050 | 91 | 20 | 823 | 720 | 930 | 1.1 | 50 | 680 | 6 | 5 | 665 | 65 | 150 | 0.23 |
| PRESENT INVENTION 26 | 1000 | 89 | 16 | 802 | 620 | 860 | 1.3 | 35 | 685 | 6 | 4 | 655 | 65 | 150 | 0.21 |
| PRESENT INVENTION 27 | 1000 | 89 | 16 | 810 | 650 | 870 | 1.2 | 40 | 685 | 6 | 4 | 665 | 65 | 150 | 0.21 |
| PRESENT INVENTION 28 | 1000 | 91 | 20 | 813 | 720 | 880 | 1.1 | 40 | 710 | 7 | 4 | 680 | 50 | 250 | 0.22 |
| PRESENT INVENTION 29 | 1080 | 93 | 22 | 831 | 750 | 965 | 1.1 | 75 | 680 | 5 | 4 | 655 | 55 | 250 | 0.25 |
| PRESENT INVENTION 30 | 1010 | 89 | 16 | 768 | 620 | 870 | 1.3 | 25 | 665 | 4 | 5 | 635 | 50 | 250 | 0.18 |
| PRESENT INVENTION 31 | 1000 | 88 | 15 | 742 | 580 | 850 | 1.4 | 15 | 680 | 4 | 10 | 655 | 45 | 250 | 0.16 |
| PRESENT INVENTION 32 | 1000 | 88 | 15 | 707 | 580 | 850 | 1.4 | 15 | 690 | 4 | 15 | 630 | 45 | 250 | 0.15 |

TABLE 3-continued

| | | FINISH ROLLING | | | | | MANUFACTURING CONDITION | | | | | | | | | |
|---|---|---|---|---|---|---|---|---|---|---|---|---|---|---|---|---|
| | | | | | | | | | COOLING | | | | | | | |
| | | | | | | | | FIRST-STAGE COOLING | | | SECOND-STAGE COOLING | | | | THIRD-STAGE COOLING | | ENTIRE COOLING |
| | ROLLING START TEMPERATURE (° C.) | TOTAL REDUCTION RATIO (%) | AVERAGE ROLLING RATIO FOR 3 PASSES AT REAR STAND (%) | FINISH ROLLING OUTLET SIDE SPEED (mpm) | | FINISHING TEMPERATURE (° C.) | TIME PERIOD UNTIL START OF COOLING (SECOND) | COOLING RATE (° C./SECOND) | COOLING STOP TEMPERATURE (° C.) | COOLING RATE (° C./SECOND) | HOLDING TIME PERIOD (SECOND) | COOLING STOP TEMPERATURE (° C.) | COOLING RATE (° C./SECOND) | COILING TEMPERATURE (° C.) | TOTAL CUMULATIVE DIFFUSION LENGTH (μm) |
| STEEL NUMBER | | | | | | | | | | | | | | | | |
| PRESENT INVENTION 33 | 1040 | 91 | 20 | 720 | 855 | 920 | 1.1 | 40 | 710 | 6 | 4 | 685 | 40 | 350 | 0.37 |
| PRESENT INVENTION 34 | 1020 | 91 | 20 | 720 | 831 | 900 | 1.1 | 40 | 695 | 6 | 4 | 670 | 40 | 350 | 0.28 |
| PRESENT INVENTION 35 | 1010 | 88 | 15 | 580 | 794 | 860 | 1.4 | 35 | 680 | 4 | 5 | 660 | 40 | 350 | 0.21 |
| PRESENT INVENTION 36 | 1000 | 91 | 20 | 720 | 808 | 880 | 1.1 | 40 | 680 | 6 | 4 | 655 | 40 | 350 | 0.21 |
| PRESENT INVENTION 37 | 1010 | 91 | 20 | 720 | 816 | 890 | 1.1 | 40 | 685 | 6 | 4 | 660 | 40 | 350 | 0.23 |
| PRESENT INVENTION 38 | 1000 | 91 | 20 | 720 | 814 | 880 | 1.1 | 40 | 685 | 6 | 4 | 660 | 75 | 50 | 0.21 |
| PRESENT INVENTION 39 | 1010 | 91 | 20 | 720 | 817 | 890 | 1.1 | 45 | 670 | 6 | 4 | 645 | 75 | 50 | 0.19 |
| COMPARATIVE STEEL 40 | 1020 | 91 | 20 | 720 | 789 | 900 | 1.1 | 45 | 675 | 6 | 4 | 650 | 75 | 50 | 0.16 |
| COMPARATIVE STEEL 41 | 1010 | 91 | 20 | 720 | 824 | 890 | 1.1 | 40 | 690 | 6 | 4 | 665 | 75 | 50 | 0.24 |
| COMPARATIVE STEEL 42 | 1010 | 91 | 20 | 720 | 835 | 890 | 1.1 | 40 | 700 | 6 | 4 | 675 | 80 | 50 | 0.29 |
| COMPARATIVE STEEL 43 | | | | | | | | SLAB CRACKING | | | | | | | | |
| COMPARATIVE STEEL 44 | 1105 | 91 | 20 | 720 | 931 | 985 | 1.1 | 50 | 725 | 6 | 4 | 700 | 80 | 50 | 0.65 |
| COMPARATIVE STEEL 45 | 1010 | 91 | 20 | 720 | 813 | 890 | 1.1 | 40 | 685 | 6 | 4 | 660 | 75 | 50 | 0.21 |
| COMPARATIVE STEEL 46 | 1000 | 91 | 20 | 720 | 815 | 880 | 1.1 | 40 | 690 | 4 | 4 | 665 | 75 | 50 | 0.23 |
| COMPARATIVE STEEL 47 | 1000 | 89 | 16 | 660 | 810 | 870 | 1.2 | 40 | 685 | 5 | 4 | 665 | 75 | 50 | 0.21 |
| COMPARATIVE STEEL 48 | 1000 | 91 | 20 | 720 | 809 | 880 | 1.1 | 40 | 685 | 6 | 4 | 660 | 75 | 50 | 0.21 |
| COMPARATIVE STEEL 49 | 1015 | 88 | 15 | 600 | 812 | 870 | 1.3 | 35 | 685 | 4 | 5 | 660 | 75 | 50 | 0.23 |
| COMPARATIVE STEEL 50 | 1010 | 89 | 16 | 620 | 814 | 870 | 1.3 | 35 | 685 | 5 | 5 | 665 | 75 | 50 | 0.23 |
| COMPARATIVE STEEL 51 | 1020 | 91 | 20 | 720 | 890 | 900 | 1.1 | 35 | 725 | 6 | 4 | 700 | 80 | 50 | 0.54 |

TABLE 4

| STEEL NUMBER | MICRO STRUCTURE | FERRITE TiC DENSITY (PIECE/cm³) | SECOND PHASE CHARACTERISTIC | SECOND PHASE FRACTION fsd (%) | Ex.C(%)/fsd(%) | SECOND PHASE NANO-HARDNESS Hn (GPa) | SECOND PHASE NANO-HARDNESS STANDARD DEVIATION σHn (GPa) | SECOND PHASE AVERAGE GRAIN DIAMETER (μm) | AVERAGE VALUE OF DISTANCE OF CLOSEST APPROACH BETWEEN SECOND PHASES (μm) |
|---|---|---|---|---|---|---|---|---|---|
| 1 | PRECIPITATION-STRENGTHENED PF + M | $5 \times 10^{15}$ | ISLAND SHAPE | 4.0 | 0.0059 | 11.9 | 1.0 | 8.0 | 18.8 |
| 2 | PF + M | $5 \times 10^{13}$ | ISLAND SHAPE | 5.0 | 0.0047 | 10.2 | 0.9 | 12.0 | 10.0 |
| 3 | PRECIPITATION-STRENGTHENED PF + M | $2 \times 10^{15}$ | ISLAND SHAPE | 9.0 | 0.0026 | 7.0 | 0.6 | 18.0 | 3.7 |
| 4 | PRECIPITATION-STRENGTHENED PF + M | $6 \times 10^{16}$ | ISLAND SHAPE | 4.0 | 0.0059 | 11.9 | 1.0 | 15.0 | 10.0 |
| 5 | PRECIPITATION-STRENGTHENED PF + M | $5 \times 10^{15}$ | FILM SHAPE | 3.5 | 0.0067 | 13.2 | 1.1 | 14.0 | 12.2 |
| 6 | PF + M | $2 \times 10^{13}$ | ISLAND SHAPE | 3.0 | 0.0079 | 14.9 | 1.3 | 17.0 | 11.8 |
| 7 | PF + M | $3 \times 10^{13}$ | ISLAND SHAPE | 5.0 | 0.0047 | 10.2 | 0.9 | 7.0 | 17.1 |
| 8 | PRECIPITATION-STRENGTHENED PF + M | $2 \times 10^{16}$ | ISLAND SHAPE | 9.0 | 0.0026 | 7.0 | 0.6 | 16.0 | 4.2 |
| 9 | PRECIPITATION-STRENGTHENED PF + M | $2 \times 10^{16}$ | ISLAND SHAPE | 5.0 | 0.0047 | 10.2 | 0.9 | 11.0 | 10.9 |
| 10 | PRECIPITATION-STRENGTHENED PF + M | $3 \times 10^{15}$ | ISLAND SHAPE | 5.5 | 0.0043 | 9.5 | 0.8 | 15.0 | 11.0 |
| 11 | PRECIPITATION-STRENGTHENED PF + M | $2 \times 10^{16}$ | ISLAND SHAPE | 4.5 | 0.0052 | 11.0 | 0.9 | 15.0 | 12.0 |
| 12 | WORKED F + M | $2 \times 10^{9}$ | ALIGNED STATE | 3.0 | 0.0079 | 14.9 | 1.3 | 20.0 | 4.0 |
| 13 | PRECIPITATION-STRENGTHENED PF + M | $5 \times 10^{16}$ | ISLAND SHAPE | 31.0 | 0.0008 | 4.1 | 0.4 | 18.0 | 6.0 |
| 14 | PF + M | $5 \times 10^{11}$ | ISLAND SHAPE | 5.0 | 0.0047 | 10.2 | 0.9 | 21.0 | 5.7 |
| 15 | PF + P | $2 \times 10^{11}$ | — | — | — | — | — | — | — |
| 16 | B | UNOBSERVED | — | — | — | — | — | — | — |
| 17 | B | UNOBSERVED | — | — | — | — | — | — | — |
| 18 | PF + M | $2 \times 10^{11}$ | ISLAND SHAPE | 10.0 | 0.0024 | 6.6 | 0.6 | 12.0 | 5.0 |
| 19 | B | UNOBSERVED | — | — | — | — | — | — | — |
| 20 | PRECIPITATION-STRENGTHENED PF + M | $2 \times 10^{15}$ | ISLAND SHAPE | 3.0 | 0.0079 | 14.9 | 1.3 | 12.0 | 16.7 |
| 21 | PF + P | $2 \times 10^{13}$ | — | — | — | — | — | — | — |
| 22 | PF + B + COARSE θ | $5 \times 10^{9}$ | — | — | — | — | — | — | — |
| 23 | PRECIPITATION-STRENGTHENED PF + M | $3 \times 10^{16}$ | ISLAND SHAPE | 3.0 | 0.0093 | 17.1 | 1.5 | 11.0 | 18.2 |
| 24 | PRECIPITATION-STRENGTHENED PF + M | $2 \times 10^{16}$ | ISLAND SHAPE | 3.0 | 0.0083 | 15.7 | 1.3 | 12.0 | 16.7 |
| 25 | PRECIPITATION-STRENGTHENED PF + M | $1 \times 10^{16}$ | ISLAND SHAPE | 2.0 | 0.0053 | 11.0 | 0.9 | 15.0 | 20.0 |
| 26 | PRECIPITATION-STRENGTHENED PF + M | $5 \times 10^{16}$ | ISLAND SHAPE | 8.0 | 0.0077 | 14.8 | 1.3 | 6.0 | 12.5 |
| 27 | PRECIPITATION-STRENGTHENED PF + M | $5 \times 10^{15}$ | ISLAND SHAPE | 5.0 | 0.0052 | 10.9 | 0.9 | 7.0 | 17.1 |
| 28 | PRECIPITATION-STRENGTHENED PF + M | $6 \times 10^{16}$ | ISLAND SHAPE | 5.0 | 0.0060 | 12.1 | 1.0 | 10.0 | 12.0 |
| 29 | PRECIPITATION-STRENGTHENED PF + M | $4 \times 10^{15}$ | ISLAND SHAPE | 4.0 | 0.0067 | 13.2 | 1.1 | 9.0 | 16.7 |
| 30 | PRECIPITATION-STRENGTHENED PF + M | $5 \times 10^{16}$ | ISLAND SHAPE | 6.0 | 0.0048 | 10.2 | 0.9 | 7.0 | 14.3 |
| 31 | PRECIPITATION-STRENGTHENED PF + M | $3 \times 10^{15}$ | ISLAND SHAPE | 5.0 | 0.0051 | 10.7 | 0.9 | 9.0 | 13.3 |
| 32 | PRECIPITATION-STRENGTHENED PF + M | $7 \times 10^{16}$ | ISLAND SHAPE | 10.0 | 0.0030 | 7.6 | 0.6 | 6.0 | 10.0 |
| 33 | PRECIPITATION-STRENGTHENED PF + M | $3 \times 10^{16}$ | ISLAND SHAPE | 5.0 | 0.0051 | 10.7 | 0.9 | 7.0 | 17.1 |
| 34 | PRECIPITATION-STRENGTHENED PF + M | $4 \times 10^{16}$ | ISLAND SHAPE | 4.0 | 0.0075 | 14.3 | 1.2 | 9.0 | 16.7 |
| 35 | PRECIPITATION-STRENGTHENED PF + M | $4 \times 10^{15}$ | ISLAND SHAPE | 3.0 | 0.0081 | 15.2 | 1.3 | 12.0 | 16.7 |
| 36 | PRECIPITATION-STRENGTHENED PF + M | $3 \times 10^{16}$ | ISLAND SHAPE | 5.0 | 0.0062 | 12.4 | 1.1 | 10.0 | 12.0 |

TABLE 4-continued

| | | | | | | | | | AVERAGE VALUE OF |
| | | | | | | | SECOND PHASE NANO-HARD- | | DISTANCE |
| | | | | | | SECOND | NESS | SECOND | OF |
| | | | | | | PHASE | STAN- | PHASE | CLOSEST |
| | | FERRITE | SECOND | SECOND | | NANO- | DARD | AVER- | APPROACH |
| | | TiC | PHASE | PHASE | | HARD- | DEVI- | AGE GRAIN | BETWEEN |
| STEEL | MICRO | DENSITY | CHARAC- | FRACTION | Ex.C(%)/ | NESS | ATION | DIAM- | SECOND |
| NUMBER | STRUCTURE | (PIECE/cm³) | TERISTIC | fsd (%) | fsd(%) | Hn (GPa) | σHn (GPa) | ETER (μm) | PHASES (μm) |
|---|---|---|---|---|---|---|---|---|---|
| 37 | PRECIPITATION-STRENGTHENED PF + M | $5 \times 10^{15}$ | ISLAND SHAPE | 6.0 | 0.0047 | 10.2 | 0.9 | 6.0 | 16.7 |
| 38 | PRECIPITATION-STRENGTHENED PF + M | $5 \times 10^{16}$ | ISLAND SHAPE | 5.0 | 0.0026 | 6.9 | 0.6 | 8.0 | 15.0 |
| 39 | PRECIPITATION-STRENGTHENED PF + M | $3 \times 10^{15}$ | ISLAND SHAPE | 5.0 | 0.0090 | 16.7 | 1.4 | 7.0 | 17.1 |
| 40 | PRECIPITATION-STRENGTHENED PF + M | $3 \times 10^{16}$ | ALIGNED STATE | 31.0 | 0.0030 | 7.6 | 0.6 | 21.0 | 0.9 |
| 41 | PF | $2 \times 10^{9}$ | — | — | — | — | — | — | — |
| 42 | PRECIPITATION-STRENGTHENED PF + M | $5 \times 10^{16}$ | ISLAND SHAPE | 4.0 | 0.0080 | 15.1 | 1.3 | 9.0 | 16.7 |
| 43 | | | SLAB CRACKING | | | | | | |
| 44 | B | UNOBSERVED | — | — | — | — | — | — | — |
| 45 | PRECIPITATION-STRENGTHENED PF + M | $5 \times 10^{16}$ | ISLAND SHAPE | 4.0 | 0.0083 | 15.6 | 1.3 | 9.0 | 16.7 |
| 46 | PRECIPITATION-STRENGTHENED PF + M | $5 \times 10^{15}$ | ISLAND SHAPE | 5.0 | 0.0067 | 13.2 | 1.1 | 10.0 | 12.0 |
| 47 | PF + M | $5 \times 10^{11}$ | ISLAND SHAPE | 7.0 | 0.0067 | 13.1 | 1.1 | 11.0 | 7.8 |
| 48 | PRECIPITATION-STRENGTHENED PF + M | $5 \times 10^{15}$ | — | — | — | — | — | — | — |
| 49 | PF + M | $5 \times 10^{8}$ | ISLAND SHAPE | 5.0 | 0.0116 | 20.6 | 1.8 | 15.0 | 8.0 |
| 50 | PF + M | UNOBSERVED | ISLAND SHAPE | 11.0 | 0.0057 | 11.6 | 1.0 | 6.0 | 9.1 |
| 51 | WORKED F + M | $2 \times 10^{8}$ | ALIGNED STATE | 4.0 | 0.0079 | 15.0 | 1.3 | 21.0 | 7.1 |

TABLE 5

| | | | | | | | CORROSION RESISTANCE | | |
| | | | | | | | CONVERSION TREATMENT PROPERTY | | |
| | | | | | | | PRESENCE/ ABSENCE | | POST-COATING |
| | MECHANICAL PROPERTY | | | | SURFACE PROPERTY | | OF LACK | | CORROSION |
| | TENSILE TEST | | | HOLE EXPANSION | NOTCH FATIGUE | SURFACE DEFECT ○: NONE | ROUGHNESS | OF HIDING ○: NONE | | MAXIMUM PEELED |
| STEEL NUMBER | YP (MPa) | TS (MPa) | El (%) | λ (%) | σWK /σW0 | Δ: SLIGHT x: PRESENCE | Rz (μm) | Δ: SLIGHT x: PRESENCE | P RATIO | WIDTH (mm) |
|---|---|---|---|---|---|---|---|---|---|---|
| 1 | 593 | 790 | 24.2 | 118 | 0.41 | ○ | 18.3 | ○ | 0.95 | 2.2 |
| 2 | 402 | 538 | 34.7 | 125 | 0.34 | ○ | 19.7 | ○ | 0.90 | 0.5 |
| 3 | 591 | 782 | 23.6 | 38 | 0.34 | ○ | 14.7 | ○ | 0.93 | 3.1 |
| 4 | 606 | 798 | 23.5 | 79 | 0.36 | ○ | 13.0 | ○ | 0.85 | 2.6 |
| 5 | 612 | 806 | 22.8 | 44 | 0.35 | ○ | 10.9 | ○ | 0.90 | 0.3 |
| 6 | 377 | 532 | 34.8 | 58 | 0.34 | ○ | 14.3 | ○ | 0.85 | 0.4 |
| 7 | 376 | 522 | 36.0 | 126 | 0.33 | ○ | 13.4 | ○ | 0.89 | 1.9 |
| 8 | 633 | 816 | 23.0 | 45 | 0.34 | ○ | 16.6 | ○ | 0.88 | 0.1 |
| 9 | 599 | 781 | 24.3 | 136 | 0.36 | ○ | 19.5 | ○ | 0.89 | 1.1 |
| 10 | 610 | 793 | 24.0 | 74 | 0.35 | ○ | 17.9 | ○ | 0.86 | 0.9 |
| 11 | 603 | 787 | 24.1 | 81 | 0.37 | ○ | 16.4 | ○ | 0.89 | 2.7 |
| 12 | 588 | 784 | 23.2 | 54 | 0.35 | ○ | 11.3 | ○ | 0.87 | 0.9 |
| 13 | 623 | 822 | 19.1 | 41 | 0.33 | ○ | 12.5 | ○ | 0.89 | 2.5 |
| 14 | 393 | 508 | 35.0 | 50 | 0.34 | ○ | 16.3 | ○ | 0.89 | 2.0 |
| 15 | 568 | 741 | 24.3 | 42 | 0.22 | ○ | 12.3 | ○ | 0.92 | 1.1 |
| 16 | 461 | 533 | 21.0 | 116 | 0.23 | ○ | 14.7 | ○ | 0.89 | 0.9 |

TABLE 5-continued

| | MECHANICAL PROPERTY | | | HOLE EXPANSION | NOTCH FATIGUE | SURFACE PROPERTY | | CORROSION RESISTANCE | | |
|---|---|---|---|---|---|---|---|---|---|---|
| | TENSILE TEST | | | | | SURFACE DEFECT ○: NONE | ROUGHNESS | CONVERSION TREATMENT PROPERTY PRESENCE/ABSENCE OF LACK OF HIDING ○: NONE | | POST-COATING CORROSION MAXIMUM PEELED |
| STEEL NUMBER | YP (MPa) | TS (MPa) | El (%) | λ (%) | σWK/σW0 | Δ: SLIGHT x: PRESENCE | Rz (μm) | Δ: SLIGHT x: PRESENCE | P RATIO | WIDTH (mm) |
| 17 | 470 | 539 | 30.0 | 108 | 0.23 | ○ | 11.9 | ○ | 0.91 | 0.8 |
| 18 | 390 | 521 | 35.1 | 61 | 0.35 | ○ | 15.7 | ○ | 0.88 | 1.0 |
| 19 | 461 | 526 | 30.8 | 111 | 0.24 | ○ | 17.1 | ○ | 0.91 | 3.0 |
| 20 | 584 | 780 | 24.5 | 127 | 0.37 | ○ | 13.4 | ○ | 0.93 | 0.7 |
| 21 | 588 | 722 | 25.3 | 51 | 0.22 | ○ | 16.3 | ○ | 0.93 | 0.7 |
| 22 | 620 | 784 | 20.0 | 39 | 0.33 | ○ | 10.6 | ○ | 0.95 | 1.6 |
| 23 | 459 | 612 | 31.0 | 152 | 0.40 | ○ | 16.6 | ○ | 0.92 | 0.3 |
| 24 | 408 | 544 | 34.9 | 171 | 0.36 | ΔSi SCALE | 27.4 | x | 0.71 | 4.1 |
| 25 | 413 | 551 | 34.5 | 169 | 0.38 | ○ | 15.5 | ○ | 0.93 | 2.9 |
| 26 | 659 | 878 | 21.6 | 106 | 0.39 | ○ | 20.3 | ○ | 0.87 | 2.7 |
| 27 | 618 | 824 | 23.1 | 113 | 0.36 | ΔSi SCALE | 25.3 | x | 0.68 | 4.3 |
| 28 | 605 | 806 | 23.6 | 115 | 0.36 | ΔSi SCALE | 12.1 | ○ | 0.87 | 3.8 |
| 29 | 406 | 541 | 35.1 | 172 | 0.39 | ○ | 14.3 | ○ | 0.91 | 1.8 |
| 30 | 702 | 936 | 20.3 | 99 | 0.38 | ○ | 19.5 | ○ | 0.91 | 2.5 |
| 31 | 744 | 992 | 19.2 | 94 | 0.37 | Δ SCALE | 20.0 | ○ | 0.92 | 3.2 |
| 32 | 848 | 1131 | 16.8 | 82 | 0.37 | Δ SCALE | 19.2 | ○ | 0.95 | 0.3 |
| 33 | 631 | 841 | 22.6 | 111 | 0.37 | Δ SCALE | 16.9 | ○ | 0.94 | 0.7 |
| 34 | 591 | 788 | 24.1 | 118 | 0.40 | ○ | 16.3 | ○ | 0.93 | 3.0 |
| 35 | 486 | 48 | 29.3 | 144 | 0.38 | ○ | 12.0 | ○ | 0.92 | 0.8 |
| 36 | 611 | 815 | 23.3 | 114 | 0.39 | ○ | 11.3 | ○ | 0.90 | 0.3 |
| 37 | 635 | 820 | 23.2 | 113 | 0.39 | ○ | 11.7 | ○ | 0.86 | 3.4 |
| 38 | 602 | 802 | 23.7 | 116 | 0.38 | ○ | 17.9 | Δ | 0.80 | 4.2 |
| 39 | 506 | 675 | 28.1 | 138 | 0.37 | Δ SCALE | 13.3 | ○ | 0.88 | 0.8 |
| 40 | 698 | 948 | 13.1 | 34 | 0.36 | Δ SCALE | 11.6 | ○ | 0.93 | 0.2 |
| 41 | 366 | 455 | 37.0 | 128 | 0.35 | ○ | 14.4 | ○ | 0.92 | 3.0 |
| 42 | 636 | 871 | 21.0 | 96 | 0.37 | ΔSi SCALE | 31.1 | x | 0.61 | 7.9 |
| 43 | | | | | | SLAB CRACKING | | | | |
| 44 | 373 | 496 | 36.5 | 144 | 0.36 | ○ | 18.7 | ○ | 0.92 | 0.8 |
| 45 | 655 | 860 | 14.0 | 71 | 0.24 | ○ | 17.5 | ○ | 0.91 | 1.7 |
| 46 | 610 | 800 | 22.0 | 29 | 0.33 | Δ SCALE | 13.7 | ○ | 0.94 | 0.1 |
| 47 | 518 | 690 | 24.0 | 51 | 0.34 | Δ SCALE | 13.7 | ○ | 0.90 | 1.3 |
| 48 | 616 | 821 | 18.0 | 86 | 0.22 | Δ SCALE | 13.7 | ○ | 0.93 | 0.9 |
| 49 | 342 | 520 | 34.0 | 66 | 0.38 | ○ | 11.5 | ○ | 0.87 | 0.1 |
| 50 | 605 | 738 | 19.0 | 68 | 0.25 | ○ | 13.7 | ○ | 0.94 | 1.4 |
| 51 | 695 | 766 | 11.0 | 33 | 0.34 | Δ SCALE | 12.9 | ○ | 0.87 | 1.1 |

INDUSTRIAL APPLICABILITY

The dual phase steel sheet of the present invention can be used for various uses such as shipbuilding, construction, bridges, offshore structures, pressure vessels, linepipes, and machine parts, in addition to automobile members that are required to have workability, hole expandability, and bendability as well as having high strength such as inner sheet members, structure members, and underbody members.

The invention claimed is:
1. A dual phase steel sheet comprising:
in mass %,
C: 0.01 to 0.1%;
Mn: 0.2 to 3%;
Al: 0.04 to 1.5%;
Ti: 0.015 to 0.2%;
Si: 0 to 0.5%;
Nb: 0 to 0.06%;
Cu: 0 to 1.2%;
Ni: 0 to 0.6%;
Mo: 0 to 1%;
V: 0 to 0.2%;
Cr: 0 to 2%;
W: 0 to 0.5%;
Mg: 0 to 0.01%;
Ca: 0 to 0.01%;
REM: 0 to 0.1%;
B: 0 to 0.002%;
P: 0.01% or less;
S: 0.005% or less;
N: 0.01% or less,
in which [Ti]−48/14×[N]−48/32×[S]≥0% is satisfied and when Ex.C (%)=[C]−12/48×{[Ti]+48/93×[Nb]−48/14×[N]−48/32×[S]} is set, 0.001≤Ex.C (%)/fsd (%)≤0.01 is satisfied, and
a balance comprising Fe and impurities, wherein
at the position of ¼ thickness of a sheet thickness, a microstructure is a dual phase with its main phase composed of polygonal ferrite precipitation-strengthened by carbide of Ti and its second phase composed of 1 to 10% in area fraction (fsd (%)) of low-temperature transformation products dispersed plurally, and an average crystal diameter of the low-temperature transformation product is 3 to 15 μm and an average value of a distance of closest approach between the low-temperature transformation products is 10 to 20 μm.

2. The dual phase steel sheet according to claim 1, comprising:
in mass %,
Si: 0.02% to 0.5%.

3. The dual phase steel sheet according to claim 1, comprising:
one or two or more of
in mass %,
Nb: 0.005 to 0.06%;
Cu: 0.02 to 1.2%;
Ni: 0.01 to 0.6%;
Mo: 0.01 to 1%;
V: 0.01 to 0.2%;
Cr: 0.01 to 2%; and
W: 0.01 to 0.5%.

4. The dual phase steel sheet according to claim 1, comprising:
one or two or more of
in mass %,
Mg: 0.0005 to 0.01%;
Ca: 0.0005 to 0.01%; and
REM: 0.0005 to 0.1%.

5. The dual phase steel sheet according to claim 1, comprising:
in mass %,
B: 0.0002 to 0.002%.

6. The dual phase steel sheet according to claim 1, wherein
galvanizing is performed on its surface.

7. A manufacturing method of a dual phase steel sheet according to claim 1, the method comprising:
on a slab containing:
in mass %,
C: 0.01 to 0.1%;
Mn: 0.2 to 3%;
Al: 0.04 to 1.5%;
Ti: 0.015 to 0.2%;
Si: 0 to 0.5%;
Nb: 0 to 0.06%;
Cu: 0 to 1.2%;
Ni: 0 to 0.6%;
Mo: 0 to 1%;
V: 0 to 0.2%;
Cr: 0 to 2%;
W: 0 to 0.5%;
Mg: 0 to 0.01%;
Ca: 0 to 0.01%;
REM: 0 to 0.1%;
B: 0 to 0.002%;
P: 0.01% or less;
S: 0.005% or less;
N: 0.01% or less,
in which [Ti]−48/14×[N]−48/32×[S]≥0% is satisfied and when Ex.C (%)=[C]−12/48×{[Ti]+48/93×[Nb]−48/14×[N]−48/32×[S]} is set, 0.001≤Ex.C (%)/fsd (%)≤0.01 is satisfied, and
a balance comprising Fe and impurities, performing heating to a temperature $SRT_{min}$ (° C.) or higher, which is defined by Expression (1) below, and then in hot rolling, performing rough rolling at a reduction ratio of 20% or more in a temperature zone of not lower than 1050° C. nor higher than 1150° C. for at least one pass, and then starting finish rolling within 150 seconds in a temperature zone of 1000° C. or higher and lower than 1080° C., and completing finish rolling with the total reduction ratio for plural passes of not less than 75% nor more than 95% in a temperature zone of not lower than an Ar3 transformation point temperature +50° C. nor higher than 1000° C.; and within 3 seconds, performing cooling down to lower than the Ar3 transformation point temperature at an average cooling rate of 15° C./sec or more, and next performing cooling down to a temperature zone of higher than 600° C. at an average cooling rate of 10° C./sec or less for a time period of 1 second or longer and shorter than 100 seconds, and next performing cooling down to a temperature zone of 350° C. or lower at a cooling rate of 15° C./sec or more, and performing coiling, $$SRT_{min}=10780/\{5.13-\log([Ti]\times[C])\}-273 \qquad \text{Expression (1)}.$$

8. The manufacturing method of the dual phase steel sheet according to claim 7, further comprising:
in the hot rolling, performing rough rolling at a reduction ratio of 20% or more in a temperature zone of not lower than 1050° C. nor higher than 1150° C. for plural passes, wherein
the total reduction ratio of the rough rolling is not less than 60% nor more than 90%.

9. The manufacturing method of the dual phase steel sheet according to claim 7, further comprising:
performing cooling down to a temperature zone of 100° C. or lower and performing coiling.

10. The manufacturing method of the dual phase steel sheet according to claim 7, wherein
in the performing the cooling down to the temperature zone of higher than 600° C. at an average cooling rate of 10° C./sec or less for a time period of 1 second or longer and shorter than 100 seconds, when a total cumulative diffusion length $L_{total}$ of Ti in ferrite is expressed by Expression (3) below by adding up a diffusion length L of Ti in ferrite expressed by Expression (2) below for an infinitesimal time a Δt/sec from a cooling completing temperature to coiling, $0.15 \leq L_{total} \leq 0.5$ is satisfied, $$L=\sqrt{D(T+273)}t \qquad \text{Expression (2)},$$

$$L_{total}=\Sigma\sqrt{(D(T+273)\Delta t)} \qquad \text{Expression (3)},$$

Here, D(T+273) is a volume diffusion coefficient at T° C. t is a diffusion time period, D(T) is expressed by Expression (4) below using a diffusion coefficient D0 of Ti, an activation energy Q, and a gas constant R, $$D(T)=D0\times\text{Exp}(-Q/R\cdot(T+273)) \qquad \text{Expression (4)}.$$

11. The manufacturing method of the dual phase steel sheet according to claim 7, wherein
in the performing the cooling down to the temperature zone of higher than 600° C. at an average cooling rate of 10° C./sec or less for a time period of 1 second or longer and shorter than 100 seconds, a steel sheet is immersed in a galvanizing bath to galvanize its surface.

12. The manufacturing method of the dual phase steel sheet according to claim 11, further comprising:
on a galvanized dual phase steel sheet, performing an alloying treatment in a temperature range of 450 to 600° C.

* * * * *